United States Patent [19]

Hirabayashi et al.

[11] Patent Number: 5,065,834
[45] Date of Patent: Nov. 19, 1991

[54] DRIVING WHEEL SLIP CONTROL SYSTEM HAVING FAILSAFE FUNCTION

[75] Inventors: Kazuo Hirabayashi; Tetsuya Oono; Eitetsu Akiyama; Yukihisa Ishii; Shigenobu Sekiya; Yuji Fujimura, all of Wako, Japan

[73] Assignee: Honda Giken Kogyo Kabushiki Kaisha, Tokyo, Japan

[21] Appl. No.: 553,041

[22] Filed: Jul. 16, 1990

[30] Foreign Application Priority Data

| Jul. 17, 1989 | [JP] | Japan | 1-83898[U] |
| Jul. 17, 1989 | [JP] | Japan | 1-83899[U] |
| Jul. 17, 1989 | [JP] | Japan | 1-83900[U] |
| Jul. 17, 1989 | [JP] | Japan | 1-83901[U] |
| Jul. 17, 1989 | [JP] | Japan | 1-83904[U] |

[51] Int. Cl.$^5$ .............................. B60K 28/16
[52] U.S. Cl. .................................. 180/197
[58] Field of Search ............... 180/197; 364/426.02, 364/426.03

[56] References Cited

U.S. PATENT DOCUMENTS

| 4,075,538 | 2/1978 | Plunkett | 180/197 X |
| 4,361,871 | 11/1982 | Miller et al. | 364/426.03 |
| 4,518,044 | 5/1985 | Wiegardt et al. | 180/197 X |
| 4,765,691 | 8/1988 | Inoue et al. | 180/197 |
| 4,778,025 | 10/1988 | Sakaguchi et al. | 180/197 |
| 4,856,477 | 8/1989 | Hanaoka et al. | 180/197 X |
| 4,937,750 | 6/1990 | Gilliam | 364/426.03 X |
| 4,944,358 | 7/1990 | Wazaki et al. | 180/197 |

Primary Examiner—Charles A. Marmor
Assistant Examiner—Kevin Hurley
Attorney, Agent, or Firm—Armstrong, Nikaido, Marmelstein, Kubovcik & Murray

[57] ABSTRACT

A driving wheel slip control system installed in a vehicle and having abnormality-detecting and failsafe functions. The system includes a slip status signal-generating device for generating a slip status signal indicative of whether or not the driving wheels of the vehicle are in a predetermined slip state, and a slip level signal-generating device for generating a slip level signal indicative of a degree of slip of the driving wheels. If a logical relationship between the slip status signal and the slip level signal is abnormal, and if the prime mover for driving the driving wheels is not accelerating and at the same time the slip level signal indicates the predetermined slip state, the slip level signal is determined to be abnormal. If an abnormality is detected during driving wheel slip control, an amount of reduction in output of the driving wheels is set to a predetermined amount to thereby continue driving wheel slip control, until the prime mover enters an operating condition other than acceleration. Further, the system comprises first and second control units. The latter informs the former of three states for determining whether or not driving wheel slip control can be carried out. The first control unit has the slip level signal-generating device and the slip status signal-generating device, and inhibition of operation of these devices is retarded when it is informed of a state inhibiting driving wheel slip control, if an excessive slip state of the driving wheels is occurring.

18 Claims, 16 Drawing Sheets

M: NUMBER CORRESPONDING TO CYLINDER

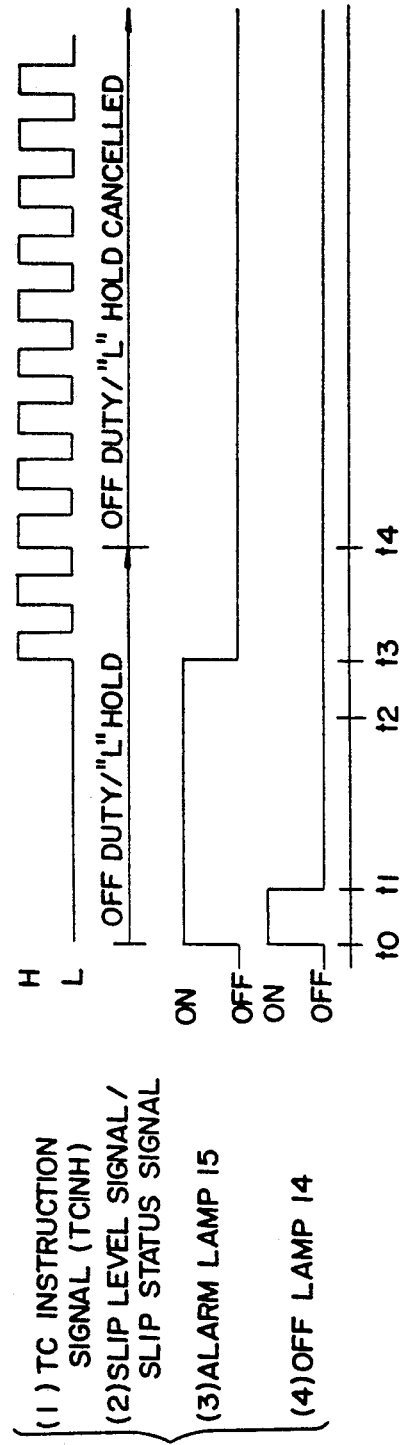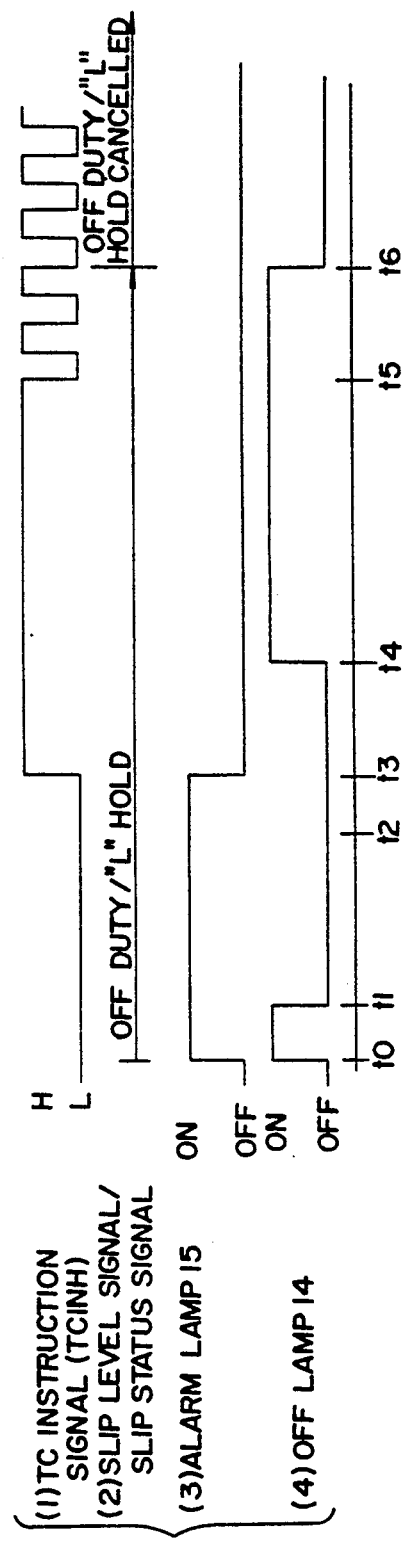

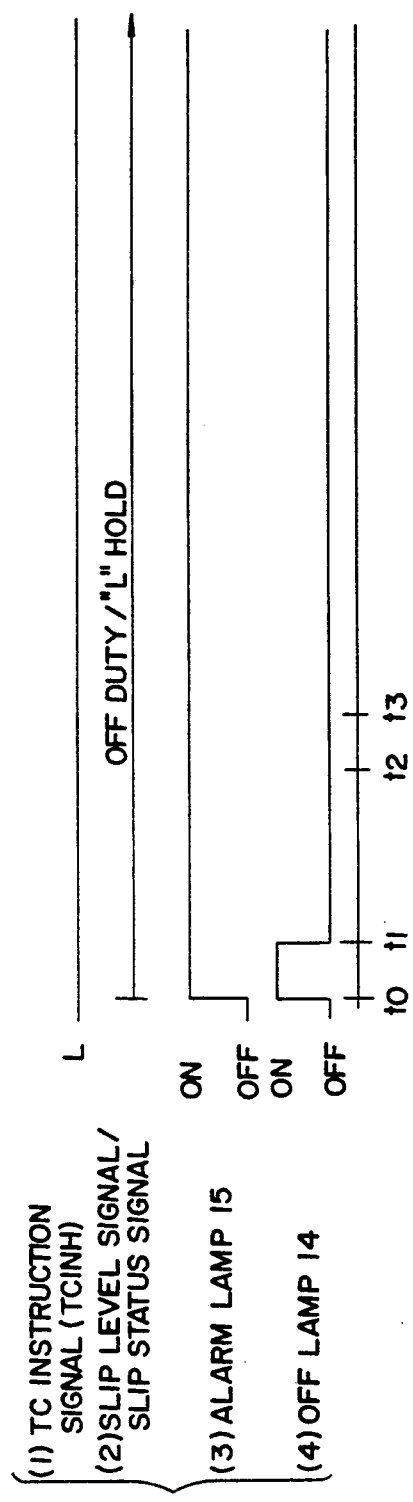

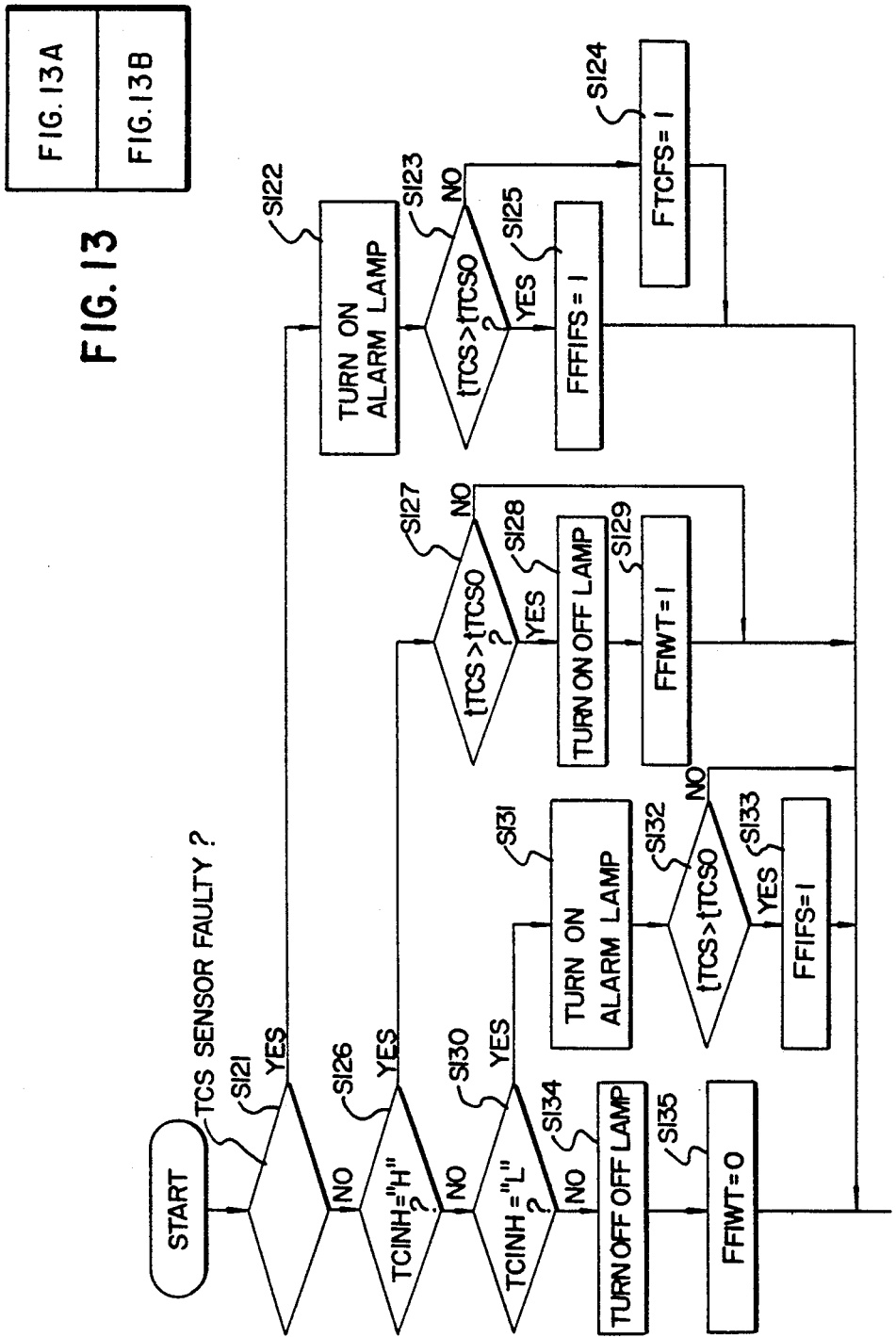

DRIVING WHEEL SLIP CONTROL SYSTEM HAVING FAILSAFE FUNCTION

BACKGROUND OF THE INVENTION

This invention relates to a driving wheel slip control system for vehicles, and more particularly to a driving wheel slip control system comprising a plurality of electronic control units and having a failsafe function for coping with an abnormality thereof.

Conventionally, there have been proposed control systems, such as a driving wheel slip control system, which are each composed of a plurality of electronic control units (hereinafter referred to as "ECU's") connected with each other by signal lines. For example, the present assignee has already proposed by Japanese Provisional Patent Publication (Kokai) No. 2-157439, a driving wheel slip control system which has an ECU (hereinafter referred to as "TSC-ECU") for detecting a slip state (degree of a slip) of driving wheels of a vehicle, and an ECU (hereinafter referred to as "ENG-ECU") for controlling output of a prime mover for driving the driving wheels based on a slip level signal which is supplied from the TCS-ECU and indicates the slip state of driving wheels in terms of an analog value, i.e. a continuously variable slip level.

A method (hereinafter referred to as "the first method") is widely known, which determines that a signal line of the above described driving wheel slip control system for transferring the slip level signal or a part or parts related thereto is abnormal when the slip level represented by the slip level signal is not within a predetermined range defined by upper and lower limit values.

Further, another method (hereinafter referred to as "the second method") is also known, which employs, in addition to the slip level signal, a slip status signal which is a binary signal representing whether or not the driving wheels are in a predetermined slip state (e.g. a slip state in which the slip level represented by the slip level signal is higher than a predetermined value), and which is also transferred from the TCS-ECU to the ENG-ECU. According to the second method, when a state in which the slip level signal and the slip status signal are contradictory to each other is detected, it is determined that one or both of signal lines for transmitting these signals is/are abnormal. More specifically, if the slip status signal indicates that the driving wheels are not in the predetermined slip state, whereas the slip level signal indicates that the driving wheels are in the predetermined slip state, or vice versa, it is determined that abnormality exists.

According to the first method, so far as the slip level represented by the slip level signal is not held outside the range defined by the upper and lower limit values, the signal line for transmitting the slip level signal is not determined to be abnormal. Therefore, the first and second methods can be combined, whereby it is possible to determine that the signal line for the slip status signal is abnormal, if the slip level signal and the slip status signal are contradictory to each other and at the same time the slip level indicated by the slip level signal is not held at a high level higher than the upper limit value nor at a low level lower than the lower limit value.

However, if some kind of oscillating signal, for example, accidentally intrudes into the signal line for the slip level signal, when the driving wheels are actually not in the aforementioned predetermined slip state and the slip status signal correctly represents the actual slip state of the driving wheels, there can be the case where the slip level indicated by the slip level signal assumes an intermediate value between the upper and lower limit values, to falsely represent the predetermined slip state of the driving wheels (hereinafter referred to as "the intermediate value hold abnormality"). In such a case, according to the above combination of the first and second methods, it is determined that the signal line for the slip status signal is abnormal since the slip level indicated by the slip level signal is not held at the high level nor at the low level. Thus, it is impossible to detect the intermediate value hold abnormality resulting from the aforementioned abnormality of the signal line for transmitting the slip level signal.

Further, if driving wheel slip control is stopped immediately when abnormality of the slip level signal or the slip status signal is detected by either or combination of the first and second methods, there can occur a sudden rise in the torque of driving wheels, to thereby degrade the driveability of the vehicle.

On the contrary, if driving wheel slip control is continued even though an abnormality has been detected, there is an undersired possibility of the control being carried out based on information (i.e. the slip level signal or the slip status signal) which does not correctly represent the actual slip state of driving wheels.

Further, in addition to cases where an abnormality is detected as described above, if the engine coolant temperature, for example, is very high such that the engine can overheat if the amount of fuel supplied to the engine is decreased, driving wheel slip control by decreasing the amount of fuel should be inhibited. If such a hot state occurs while driving wheel slip control is being carried out, and driving wheel slip control is immediately stopped, the same incovenience as described above (i.e. degradation of the driveability of the vehicle) results.

It is also generally known that in the above-mentioned control system having two ECU's, one of the two ECU's checks abnormality of the other and the one sends the result of checking to the other. In the aforementioned driving wheel slip control system proposed by the present assignee as well, the ENG-ECU checks abnormality of the TCS-ECU (or the signal line connecting the ECU's with each other) based on the slip level signal, and sends the result of checking to the TCS-ECU.

However, depending on operating conditions of the prime mover, there are cases where driving wheel slip control should preferably be inhibited (e.g. when the warming-up of the engine is not completed, or when the engine coolant temperature is extremely high). According to the above-mentioned manner of communication between the ECU's, even in such cases, no information is sent from the ENG-ECU to the TCS-ECU so long as no abnormality of the TCS-ECU is detected by the ENG-ECU. Therefore, even in cases where driving wheel slip control should not be carried out, which makes calculations by the TCS-ECU unnecessary, the TCS-ECU carries out calculations nevertheless, which leaves room for improvement of the driving wheel slip control system.

Further, in the aforesaid proposed system, the TCS-ECU is adapted to warn the driver of a detected abnormality of the driving wheel slip control system, e.g. by lighting a lamp. In such cases, if no abnormality of the TCS-ECU etc. is detected and at the same time driving wheel slip control should not be carried out, it is impossible to inform the driver of the state of the system in which driving wheel slip control cannot be carried out.

SUMMARY OF THE INVENTION

It is a first object of the invention to provide a driving wheel slip control system which is capable of properly detecting even such an abnormality that the slip level indicated by a slip level signal indicative of the degree of a slip of driving wheels is held at an intermediate value.

It is a second object of the invention to provide a driving wheel slip control system which is capable of carrying out proper operations when an abnormality of the slip level signal and/or a slip status signal is detected, or when an operating condition of the prime mover in which driving wheel slip control should be inhibited is detected.

It is a third object of the invention to provide a driving wheel slip control system in which a TCS-ECU is capable of carrying out proper operations when an ENG-ECU has determined that driving wheel slip control should be inhibited.

To attain the above objects, according to a first aspect of the invention, there is provided a driving wheel slip control system which is installed in a vehicle having driving wheels, for controlling a slip of the driving wheels, the vehicle having a prime mover installed therein for driving the driving wheels, the system including slip status signal-generating means for detecting an excessive slip state of the driving wheels and generating a slip status signal indicative of whether or not the driving wheels is in a predetermined slip state, slip level signal-generating means for generating a slip level signal indicative of a degree of slip of the driving wheels, and abnormality-determining means for determining that the slip status signal is abnormal when a logical relationship between the slip status signal and the slip level signal is abnormal.

The driving wheel slip control system according to the first aspect of the invention is characterized by comprising:

prime mover operating condition-determining means for determining whether or not the prime mover is accelerating when the abnormality-determining means determines that the slip status signal is abnormal; and redetermining means for determining that the slip level signal is abnormal when the prime mover is not accelerating and at the same time the slip level signal indicates a degree of slip coresponding to the predetermined slip state.

Preferably, the driving wheel slip control system includes control-inhibiting means for inhibiting slip control of the driving wheels irrespective of output of the slip level signal when the redetermining means determines that the slip level signal is abnormal.

A second aspect of the invention is characterized by comprising control inhibiting means for causing slip control of the driving wheels responsive to the slip level signal to be continued until it is determined that the prime mover is in an operating condition other than acceleration, and inhibiting the slip control of the driving wheels thereafter while the prime mover is in the operating condition other than acceleration.

According to a third aspect of the invention, there is provided a driving wheel slip control system which is installed in a vehicle having driving wheels, for controlling a slip of the driving wheels, the system including slip level signal-generating means for generating a slip level signal indicative of a degree of slip of the driving wheels, and abnormality-determining means supplied with the slip level signal for determining that the slip level signal is abnormal.

The driving wheel slip control system according to the third aspect of the invention is characterized by comprising:

driving wheel output-reducing means for setting an amount of reduction in output of the driving wheels to a predetermined amount when it is determined that the slip level signal is abnormal during execution of slip control of the driving wheels.

Preferably, the predetermined amount is such an amount as to allow the vehicle to run at a speed of 60 km/h to 100 km/h at the maximum output of the driving wheels that is obtained when the amount of reduction in output of the driving wheels is set to the predetermined amount.

More preferably, the driving wheel output-reducing means includes reduction amount-decreasing means for decreasing the amount of reduction in output of the driving wheels as time elapses.

Also preferably, the vehicle has a prime mover installed therein for driving the driving wheels, and the system includes prime mover operating condition-determining means for determining, from a time point the abnormality-determining means determines that the slip level signal is abnormal, whether or not the prime mover is accelerating, and control-inhibiting means for inhibiting slip control of the driving wheels when it is determined that the prime mover is not accelerating.

According to fourth aspect of the invention, there is provided a driving wheel slip control system which is installed in a vehicle having driving wheels, for controlling a slip of the driving wheels, the system including excessive slip signal-generating means for detecting an excessive slip state of the driving wheels and generating an excessive slip signal when the driving wheels are in a predetermined slip state, driving wheel output-reducing means for reducing output of the driving wheels based on the excessive slip signal from the excessive slip signal-generating means, control-permitting state-determining means for determining whether the output of the driving wheels can be reduced by the driving wheel output-reducing means, and operation-stopping means for stopping operation of the excessive slip signal-generating means when the control-permitting state-determining means outputs a signal indicating that the output of the driving wheels cannot be reduced by the driving wheel output-reducing means.

The driving wheel slip control system according to the fourth aspect of the invention is characterized comprising:

retarding means for retarding stopping operation of the operation-stopping means when the excessive slip-signal generating means detected the excessive slip state of the driving wheels a predetermined time period or a time period shorter than the predetermined time period before the control-permitting state-determining means outputs the signal indicating that the output of the driving wheels cannot be reduced by the driving wheel output-reducing means.

According to a fifth aspect of the invention, there is provided a driving wheel slip control system which is installed in a vehicle having driving wheels, for controlling a slip of the driving wheels, the vehicle having a prime mover installed therein for driving the driving wheels, the system including a first control unit having slip level signal-generating means for generating a slip level signal indicative of a degree of slip of the driving wheels, and a second control unit having prime mover output-reducing means responsive to the slip level signal for reducing output of the prime mover, and abnormality-determining means supplied with the slip level signal for determining that the slip level signal is abnormal.

The driving wheel slip control system according to the fifth aspect of the invention is characterized in that the second control unit includes operation-permitting state-determining means for determining whether or not the prime mover output-reducing means can be operated, and notifying means responsive to output from the abnormality-determining means and output from the operation-permitting state-determining means for detecting a first state in which the slip level signal is abnormal, a second state in which the slip level signal is abnormal but the prime mover output-reducing means cannot be operated, and a third state in which the slip level signal is normal and at the same time the prime mover output-reducing means can be operated, and informing the first control unit of a detected one of the first to third states.

Preferably, the slip level signal-generating means of the first control unit is inhibited from operating when the first control unit is informed of detection of the first state or the second state by the second control unit.

Also preferably, the system includes indicating means for discriminately indicating each of the first to third states, and the first control unit drives the indicating means in response to information from the notifying means.

More preferably, the system includes a power supply for supplying operating voltage to the system, and the abnormality-determining means determines that the slip level signal is abnormal, based upon a value of the slip level signal assumed when the power supply is started.

Further preferably, the operation-permitting state-determining means includes prime mover sensor abnormality-determining means for determining whether or not any of sensors for sensing operating conditions of the prime mover for controlling same is abnormal.

The above and other objects, features, and advantages of the invention will become more apparent from the ensuing detailed description taken in conjunction with the accompanying drawings.

BRIEF DESCRIPTION OF THE DRAWINGS

FIGS. 9, 9a, and 9b a flowchart of a program for detecting an abnormality of a second signal line (TCSTB line) within the driving wheel slip control system and the the intermediate value hold abnormality occurring on the TCFC line;

FIGS. 12a to 12c are diagrams showing examples of control responsive to a signal (TC instruction signal) transmitted along the TCINH line; and FIGS. 13, 13a, and 13b a flowchart of a program for carrying out failsafe operations by the TCS-ECU.

DETAILED DESCRIPTION

The invention will now be described in detail with reference to the drawings.

Figure 1:
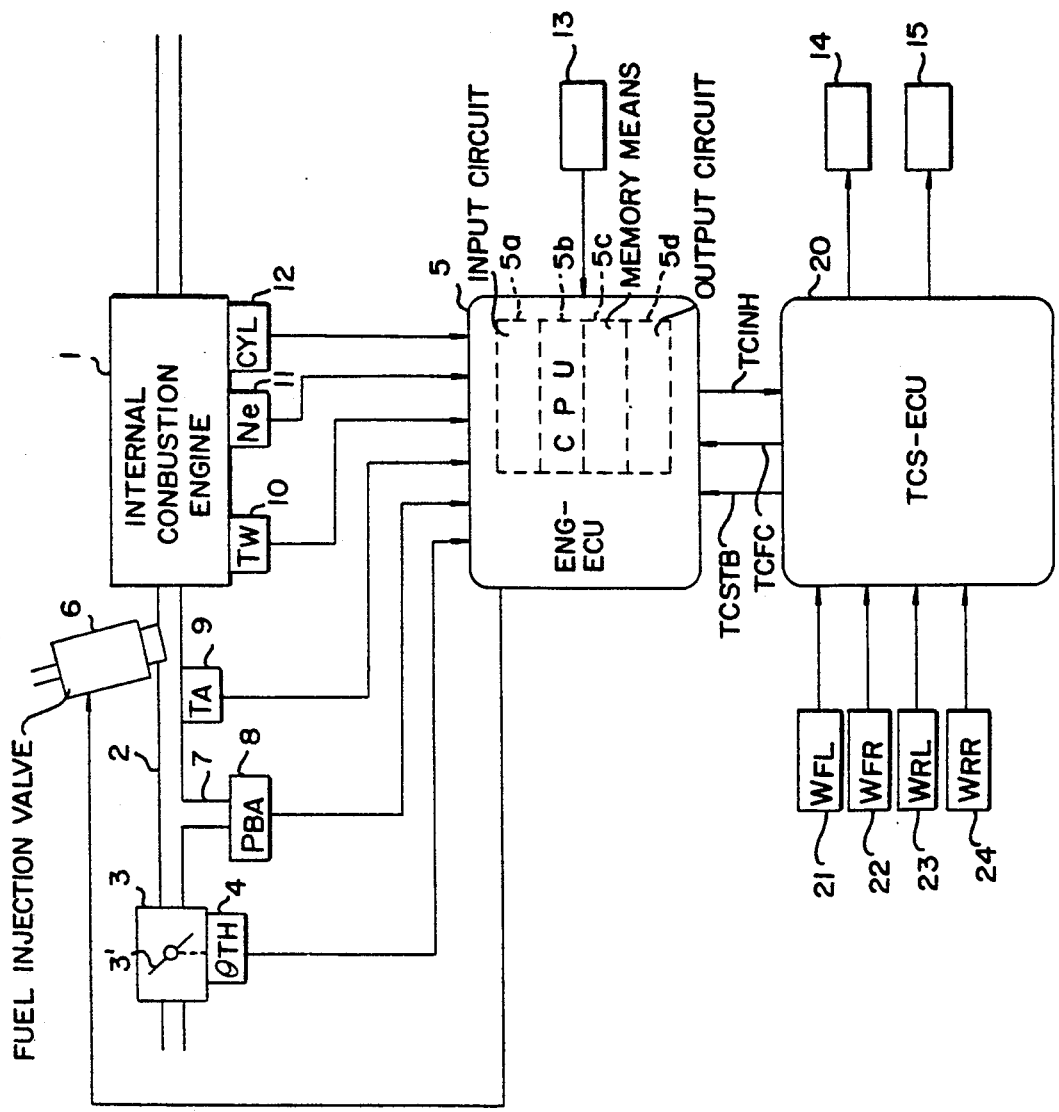
FIG. 1 is a schematic diagram showing the whole arrangement of a driving wheel slip control system according to an embodiment of the invention.

FIG. 1 shows the whole arrangement of a driving wheel slip control system according to an embodiment of the invention. In the figure, reference numeral 1 designates an internal combustion engine. Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying same to an electronic control unit (hereinafter called "the ENG-ECU") 5 for controlling the amount of fuel to be supplied to the engine.

Fuel injection valves 6, only one of which is shown, are inserted into the intake pipe at locations intermediate between the cylinder block of the engine 1 and the throttle valve 3' and slightly upstream of respective intake valves, not shown. The fuel injection valves 6 are connected to a fuel pump, not shown, and electrically connected to the ENG-ECU 5 to have their valve opening periods controlled by signals therefrom.

On the other hand, an intake pipe absolute pressure ($P_{BA}$) sensor 8 is provided in communication with the interior of the intake pipe 2 at a location immediately downstream of the throttle valve 3' by way of a conduit 7 for supplying an electric signal indicative of the sensed absolute pressure within the intake pipe 2 to the ENG-ECU 5. An intake air temperature ($T_A$) sensor 9 is inserted into the intake pipe 2 at a location downstream of the open end of the conduit 7 for supplying an electric signal indicative of the sensed intake air temperature $T_A$ to the ENG-ECU 5.

An engine coolant temperature ($T_W$) sensor 10, which may be formed of a thermistor or the like, is mounted in the cylinder block of the engine 1, for supplying an electric signal indicative of the sensed engine coolant temperature $T_W$ to the ENG-ECU 5. An engine rotational speed (Ne) sensor 11 and a cylinder-discriminating (CYL) sensor 12 are arranged in facing relation to a camshaft, not shown, or a crankshaft, not shown, of the engine 1. The engine rotational speed sensor 11 generates a pulse as a TDC signal pulse at each of predetermined crank angles whenever the crankshaft rotates through a predetermined angle, i.e. the same number of TDC signal pulses as the number of the cylinders per each rotation of the camshaft, while the cylinder-discriminating sensor 12 generates a pulse at a predetermined crank angle of a particular cylinder of the engine, both of the pulses being supplied to the ENG-ECU 5.

Further electrically connected to the ENG-ECU 5 by way of signal lines TCSTB, TCFC, and TCINH, referred to hereinafter, is an electronic control unit for sensing driving wheel slip (hereinafter referred to as "TCS-ECU") 20, to which are connected driving wheel speed sensors 21, 22 for detecting rotational speeds $W_{FR}$, $W_{FL}$ of respective right and left driving wheels, not shown, and trailing wheel speed sensors 23, 24 for detecting rotational speeds $W_{RR}$, $W_{RL}$ of respective right and left trailing wheels, not shown. Signals indicative of the detected rotational speeds of the wheels detected by the sensors 21 to 24 are supplied to the TCS-ECU 20. Also connected to the TCS-ECU 20 are an off lamp 14 indicating that driving wheel slip control is not being carried out, and an alarm lamp 15 for indicating that the control system is abnormal. The TCS-ECU 20 controls lighting of these lamps 14, 15.

Further electrically connected to the ENG-ECU is a battery voltage sensor 13, which detects the output voltage of a battery, not shown, which supplies an operating voltage to the ECU's 5, 20, and supplies a signal indicative of the detected battery voltage to the ENG-ECU 5.

In this embodiment, the ENG-ECU 5 comprises abnormality-determining means, prime mover operating condition-determining means, redetermining means, control-inhibiting means, driving wheel output-reducing means, reduction amount-decreasing means, control-permitting state-determining means, prime mover output-reducing means, operation-permitting state-determining means, notifying means, and prime mover sensor abnormality-determining means, while the TCS-ECU 20 comprises slip status signal-generating means, slip level signal-generating means, excessive slip signal-generating means, operation-stopping means, and retarding means.

The ENG-ECU 5 comprises an input circuit 5a having the functions of shaping the waveforms of input signals from various sensors and the TCS-ECU 20, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed in the CPU 5b and for storing results of calculations therefrom, etc., and an output circuit 5d which outputs driving signals to the fuel injection valves 6.

The CPU 5b operates in response to the above-mentioned signals from the sensors to determine operating conditions in which the engine 1 is operating, and calculates, based upon the determined operating conditions, the valve opening period or fuel injection period $T_{OUT}$ over which the fuel injection valves 6 are to be opened, by the use of the following equation (1) in synchronism with inputting of TDC signal pulses to the ENG-ECU 5.

$$T_{OUT} = T_i \times K_1 + K_2 \quad (1)$$

where Ti represents a basic fuel amount, more specifically a basic fuel injection period of the fuel injection valves 6, which is determined based upon the engine rotational speed Ne and the intake pipe absolute pressure $P_{BA}$. As a Ti map for determining a value of the basic fuel amount Ti, a normal Ti map to be used under normal operating conditions of the engine in which traction control (driving wheel slip control), described in detail hereinafter, is not carried out, and a traction control Ti map to be used during traction control, are stored in the memory means 5c. The values of the basic fuel amount Ti of the traction control Ti map are so set that a value of the air-fuel ration (e.g. A/F = 18.0) leaner than a stoichiometric ration is obtained.

$K_1$ and $K_2$ represent correction coefficients and correction variables, respectively, which are calculated based on various engine operating parameter signals to such values as to optimize operating characteristics of the engine such as fuel consumption and accelerability, depending on operating conditions of the engine.

The CPU 5b supplies through the output circuit 5d driving signals for driving the fuel injection valves 6 based upon the fuel injection period $T_{OUT}$ calculated as above.

Figure 2:
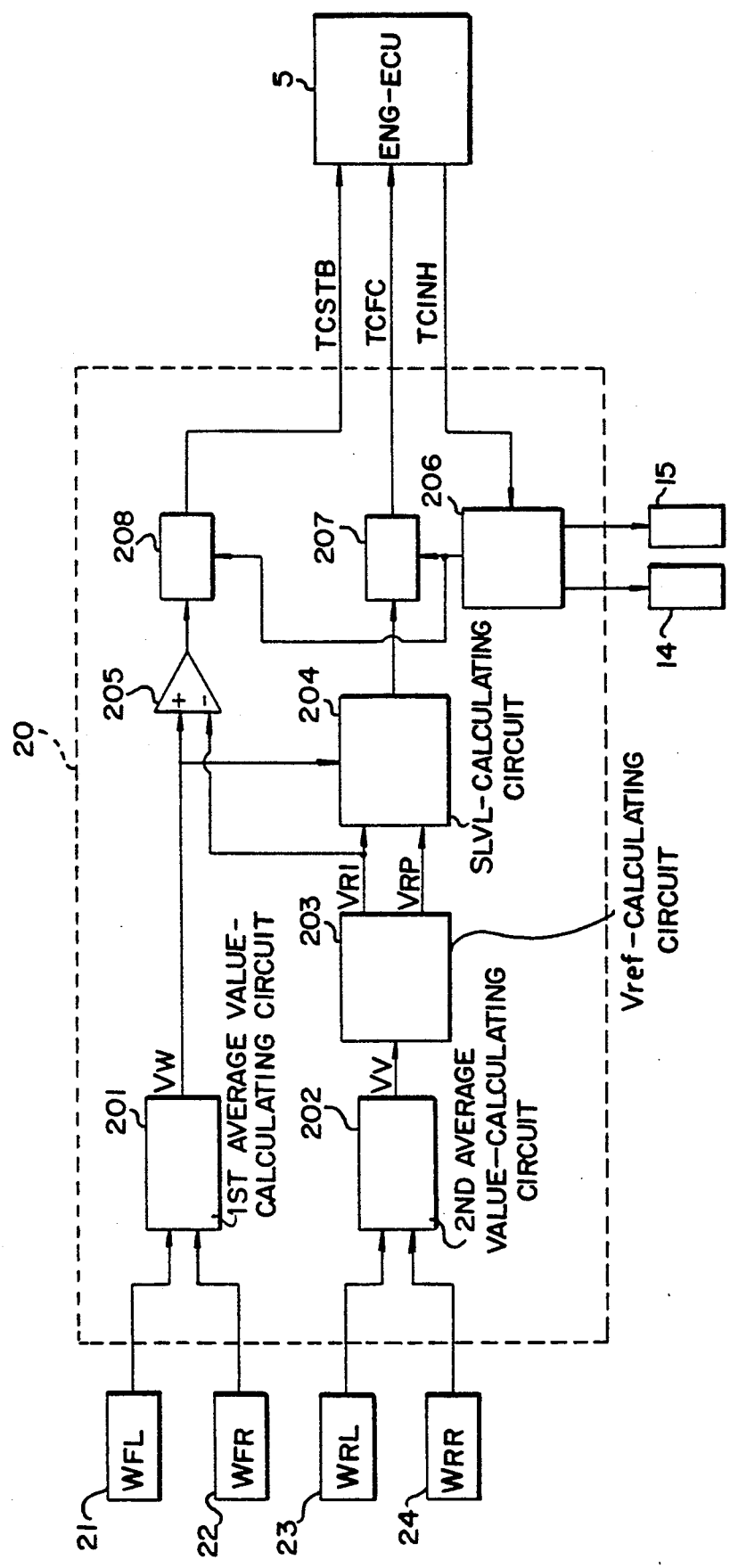
FIG. 2 is a block diagram showing the construction of an electronic control unit (TCS-ECU) for detecting slips of driving wheels.

FIG. 2 shows the internal construction of the TCS-ECU 20. Signals from the right and left driving wheel speed sensors 21, 22 are supplied to a first average value-calculating circuit 201, which calculates an average value $V_W (=(W_{FL}+W_{FR})/2)$ of the rotational speeds of the right and left driving wheels and supplies the calculated value to an $S_{LVL}$-calculating circuit 204, referred to hereinafter.

On the other hand, signals from the right and left trailing wheel speed sensors 23, 24 are supplied to a second average value-calculating circuit 202, which calculates an average value $V_V [=(W_{RL}+W_{RR})/2]$ of the rotational speeds of the right and left trailing wheels as a vehicle speed, and supplies the calculated value to a reference driving wheel speed ($V_{ref}$)-calculating circuit 203. The reference driving wheel speed ($V_{ref}$)-calculating circuit 203 calculates a desired value $V_{RP}$ of the driving wheel speed, and a first predetermined reference driving wheel speed $V_{R1}$, as reference driving wheel speeds (Vref) corresponding to the vehicle speed $V_V$, and supplies the calculated values to the $S_{LVL}$-calculating circuit 204.

The two reference driving wheel speeds $V_{R1}$ and $V_{RP}$ are set such that the slip rate $\lambda$ of driving wheels $[\lambda = (V_W+V_V)/V_W]$ should assume e.g. 5% and 8%, respectively, at $V_{R1}$ and $V_{RP}$. When the detected driving wheel speed $V_W$ exceeds the first predetermined driving wheel speed $V_{R1}$ (i.e. when the slip rate $\lambda$ exceeds 5%), the traction control is started.

The $S_{LVL}$-calculating circuit 204 calculates a slip level $S_{LVL}$ as a parameter corresponding to the degree of a slip of driving wheels, based on the detected driving wheel speed $V_W$, and the reference driving wheel speeds $V_{R1}$ and $V_{RP}$, and supplies the results of calculation to a first output circuit 207. The first output circuit 207 generates a pulse signal having a duty ratio variable in accordance with the slip level $S_{LVL}$, and supplies the pulse signal as a slip level signal to the ENG-ECU 5 by way of a first signal line TCFC (hereinafter referred to as "the TCFC line"). In this embodiment, the slip level $S_{LVL}$ assumes a larger value as the slip rate $\lambda$ of driving wheels is larger.

On the other hand, the detected driving wheel speed $V_W$ is supplied to a noninverting input of a comparator 205, while the first reference driving wheel speed $V_{R1}$ to an inverting input of same. The comparator outputs a binary signal which is at high level when a condition of $V_W > V_{R1}$ is satisfied and at low level when a condition of $V_W < V_{R1}$ is satisfied, i.e. a binary signal which is at high level when the driving wheels are in a slip state which demands traction control, and supplies the binary signal to a second output circuit 208. The second output circuit 208 supplies the binary signal as a slip status signal to the ENG-ECU 5 by way of a second signal line TCSTB (hereinafter referred to as "the TCSTB line").

Connected to the output circuits 207, 208 is a control circuit 206 which is connected to the off lamp 14 and the alarm lamp 15.

The control circuit 206 detects abnormality of the TCS-ECU 20 caused by a drop in the source voltage and the like, and at the same time controls outputting of the output circuits 207, 208 and lighting of the off lamp 14 and the alarm lamp 15, depending on whether this abnormality is detected or not and on a traction control execution-instructing signal (hereinafter referred to as "the TC instruction signal") supplied from the ENG-ECU 5 by way of a third signal line TCINH (hereinafter referred to as "the TCINH line"). If the control circuit 206 detects the abnormality of the TCS-ECU 20 per se, it holds outputs from the output circuits 207, 208 at high level to thereby inform the ENG-ECU 5 of the abnormality. The control carried out based on the TC instruction signal supplied from the ENG-ECU 5 by way of the TCINH line will be referred to hereinafter.

Input terminals of the ENG-ECU connected to the TCFC line and the TCSTB line are connected to the power supply by way of a resistance (i.e. pulled up). Therefore, if one or both of the signal lines is/are disconnected, the corresponding signal(s) inputted to the ENG-ECU is/are held at (a) high level(s). This is for carrying out a failsafe control (control for decreasing the engine output) immediately when disconnection of a line has occurred.

Figure 3A:
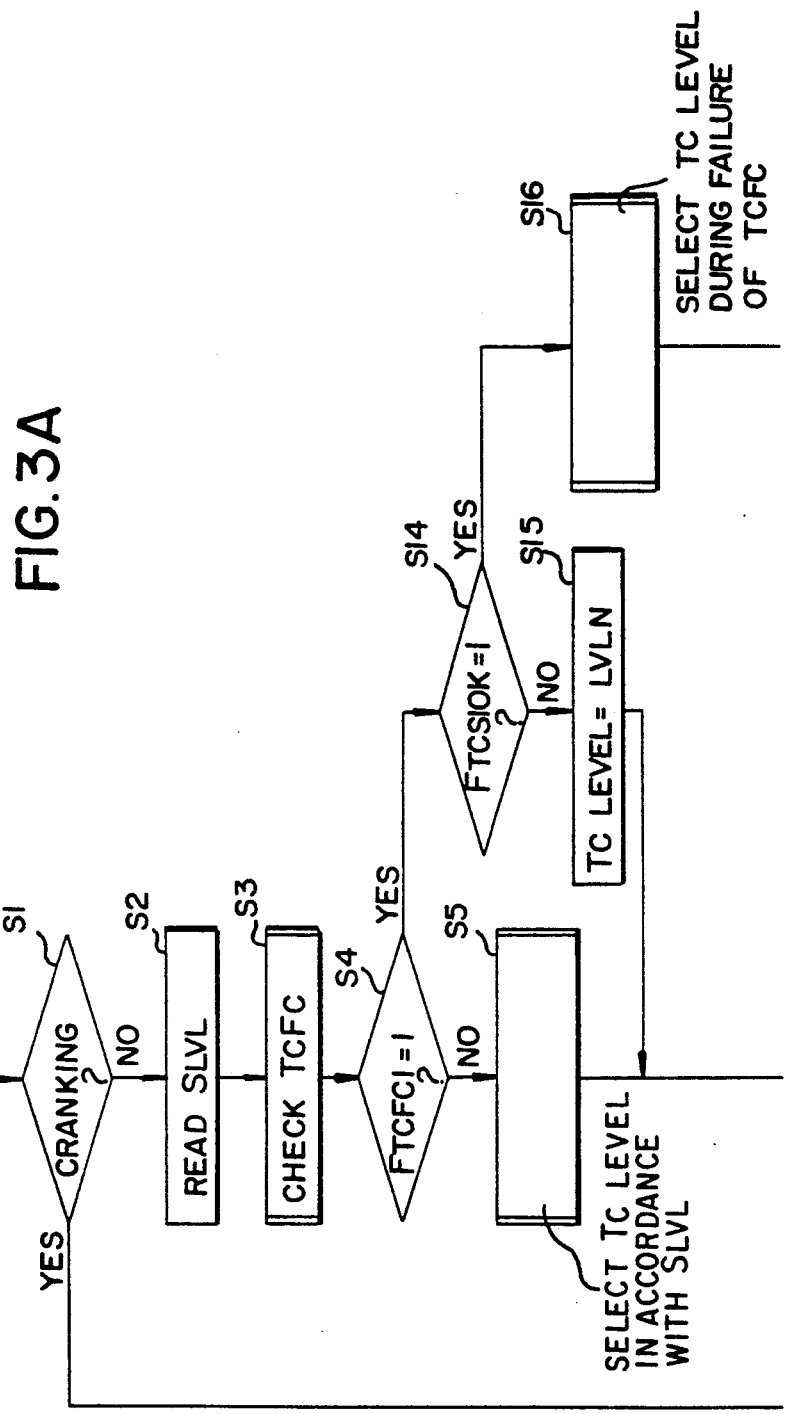
FIGS. 3, 3a, and 3b show a flowchart of a program for carrying out driving wheel slip control.
Figure 3:
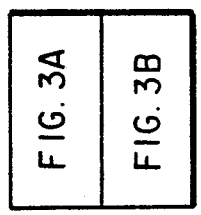
Figure 3B:
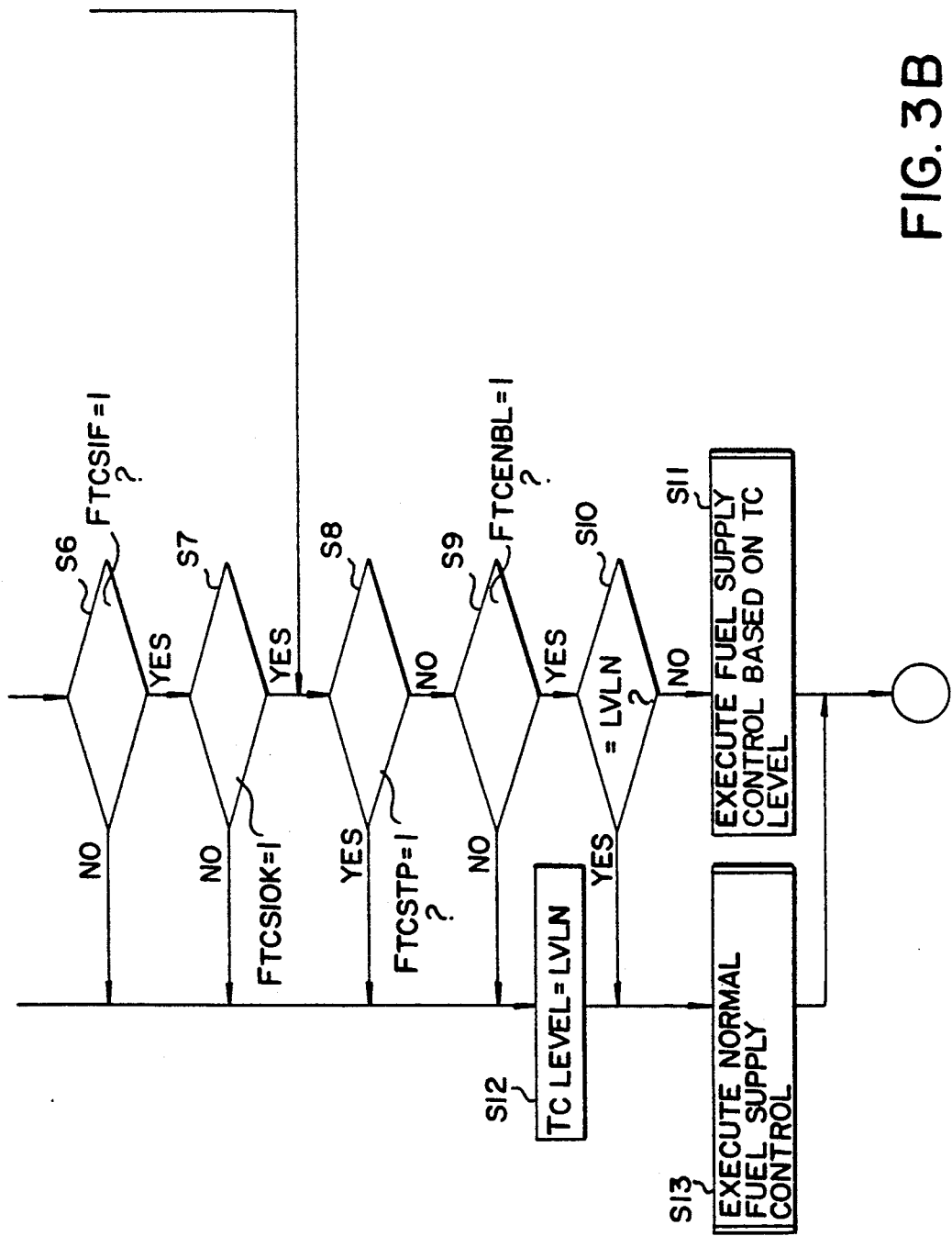

FIG. 3 shows a program of traction control, i.e. engine output control by carrying out leaning or fuel cut of the mixture to be supplied to the engine 1 in response to the slip level $S_{LVL}$. This program is executed upon generation of each TDC signal pulse and in synchronism therewith.

First, at a step S1, it is determined whether or not the engine 1 is being started or cranked. If the answer to this question is affirmative (Yes), i.e. if the engine is being started, the traction control level (hereinafter referred to as "the TC level") is set to a level LVLN at a step S12, whereby normal fuel supply control is carried out at a step S13. If the answer to the question of the step S1 is negative (No), i.e. if the engine 1 is not being cranked but operation thereof has become self-sustaining, the value of the slip level $S_{LVL}$ is read from the slip level signal inputted by way of the TCFC line (step S2). Then at a step S3, checking of abnormality of the TCFC line is carried out based on a flowchart of a subroutine shown in FIG. 4.

At a step S21 in FIG. 4, it is determined whether or not a second TCFC flag $F_{TCFC2}$ set at a step S30 referred to hereinafter is equal to 1. If the answer to this question is affirmative (Yes), i.e. if $F_{TCFC2} = 1$, the present subroutine is immediately terminated, whereas if the answer is negative (No), i.e. if $F_{TCFC2} = 0$, it is determined at a step S22 whether or not the slip level $S_{LVL}$ is higher than a predetermined upper limit value TCFCFSH. If the answer to this question is negative (No), i.e. if $S_{LVL} \leq$ TCFCFSH, it is further determined at a step S23 whether the slip level $S_{LVL}$ is lower than a predetermined lower limit value TCFCFSL. If both the answers to the questions of the steps S22 and S23 are negative (No), i.f. if TCFCFSL $\leq S_{LVL} \leq$ TCFCFSH, it is determined that the TCFC line is normal, and a first TCFC flag $F_{TCFC1}$ is set to 0 at a step S24, followed by terminating the present subroutine.

If either of the answers to the questions of the steps S22 and S23 is affirmative, i.e. if $S_{LVL} >$ TCFCFSH or $S_{LVL} <$ TCFCFSL, it is determined at a step S25 whether the first TCFC flag $F_{TCFC1}$ is equal to 1. If the answer to this question is negative (No), i.e. if $F_{TCFC1} = 0$, the first TCFC flag $F_{TCFC1}$ is set to 1 at a step S26, and a $t_{TCFC}$ timer is set to a predetermined time period $t_{TCFC}$ (e.g. 0.3 seconds) and started at a step S27, followed by terminating the present subroutine.

If the answer to the question of the step S25 is affirmative (Yes), i.e. if $F_{TCFC1} = 1$, it is determined at a step S28 whether a battery voltage $V_B$ detected by the battery voltage sensor 13 is higher than a predetermined value $V_{BTC}$ (e.g. 8 V). If the answer to the question of the step S28 is negative (No), i.e. if $V_B \leq V_{BTC}$, the program proceeds to the step S27, whereas if the answer is affirmative (Yes), i.e. if $V_B > V_{BTC}$, it is determined at a step S29 whether the count value of the $t_{TCFC}$ timer is equal to 0. If the answer to this question is negative (No), i.e. if $t_{TCFC} > 0$, the present subroutine is immediately terminated, whereas if the answer is affirmative (Yes), i.e. if $t_{TCFC} = 0$, the second TCFC flag $F_{TCFC2}$ is set to 1 at a step S30, followed by terminating the present subroutine.

Thus, if the slip level $S_{LVL}$ is outside the range defined by the upper and lower limit values TCFCFSH and TCFCFSL, the first TCFC flag $F_{TCFC1}$ indicative of a possible abnormality of the TCFC line is set to 1, and if this state continues over the predetermined time period $t_{TCFC}$, the second TCFC flag $F_{TCFC2}$ indicative of a determinate abnormality of the TCFC line is set to 1. However, while the battery voltage $V_B$ is not higher than the predetermined value $V_{BTC}$, there is a possibility of the TCS-ECU 20 being not functioning normally due to low battery voltage. In this case, the TCS-ECU can restore its normal state if the battery voltage $V_B$ rises above the predetermined value $V_{BTC}$, and therefore the second TCFC flag $F_{TCFC2}$ is not set to 1.

Figure 4:
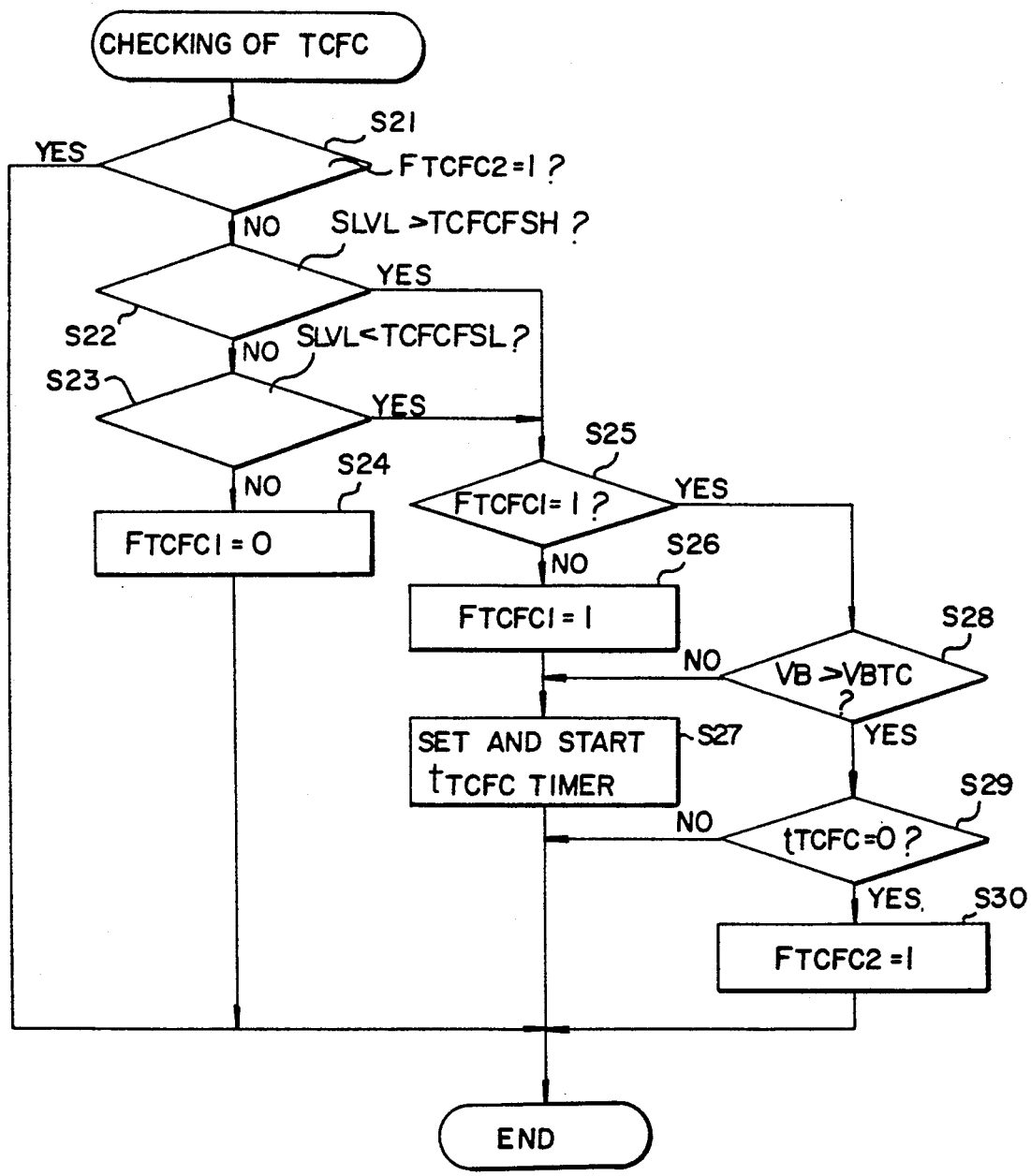
FIG. 4 is a flowchart of a program for detecting abnormality of a first signal line (TCFC line) within the driving wheel slip control system.

By the subroutine shown in FIG. 4, it is possible to detect the abnormality of the slip level signal on the TCFC line in which the slip level $S_{LVL}$ indicated by the slip level signal continues to assume an abnormally high value or an abnormally low value, and hence to detect disconnection or grounding of the TCFC line. Further, the slip level signal on the TCFC line is held at high level also when the TCS-ECU 20 is abnormal due to lowered battery voltage etc., and therefore the first TCFC flag $F_{TCFC1}$ alone is set to 1 when lowered battery voltage is responsible for the abnormality of the slip level signal on the TCFC line, while both the first and second TCFC flags $F_{TCFC1}$, $F_{TCFC2}$ are set to 1 in other cases of abnormality of same.

Figures 5, 6:
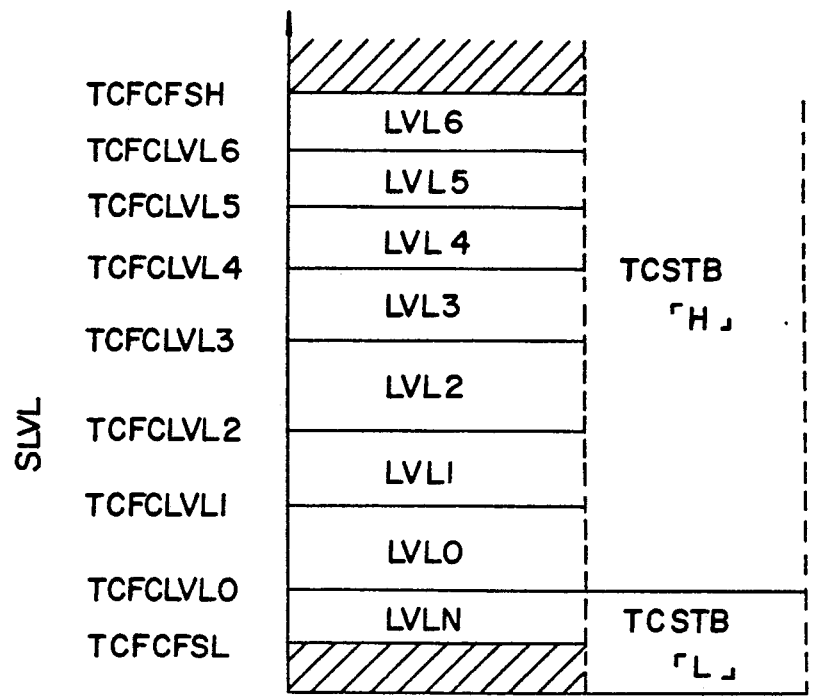
FIG. 5 is a graph showing the relationship between the slip level ($S_{LVL}$), traction control levels, and levels of a slip status signal.
FIG. 6 is a view showing a table for determining a cylinder or cylinders with respect to which leaning of the air-fuel mixture or fuel cut is to be effected in accordance with the determined traction control level (TC level)

Referring again to FIG. 3, at a step S4, it is determined whether the first TCFC flag $F_{TCFC1}$ is equal to 1. If the answer to this question is negative (No), i.e. if $F_{TCFC1} = 0$, a TC level (traction control level) is selected at a step S5 in accordance with the slip level $S_{LVL}$ in such a manner as shown in FIG. 5, for example. More specifically, the TC level is determined in the following manner:

(i) If $TCFCFSL \leq S_{LVL} < TCFCLVL0$, the TC level = LVLN.

(ii) If $TCFCLVLi \leq S_{LVL} < TCFCLVL(i+1)$, the TC level = LVLi (provided that i = 0 to 5).

(iii) If $TCFCLVL6 \leq S_{LVL} \leq TCFCFSH$, the TC level = LVL6.

where TCFCFSL and TCFCFSH are the aforementioned predetermined lower and upper limit values, respectively. TCFCLVL0 to TCFCLVL6 are predetermined values provided within the range defined by the lower and upper limit values.

Further, a value of the slip level $S_{LVL}$ which is higher than a first predetermined value TCFCLVL0 ($S_{LVL} >$ TCFCLVL0) corresponds to a value of the driving wheel speed $V_W$ detected by the TCS-ECU 20 which is higher than the first predetermined reference driving wheel speed $V_{R1}$, and the slip status signal transmitted along the TCSTB line is at high level ("H") if $S_{LVL} \geq$ TCFCLVL0, and low level ("L") if $S_{LVL} <$ TCFCLVL0. This is shown in the right-hand column of FIG. 5.

FIG. 6 shows a table for determining the manner of the traction control in accordance with the TC level. In the table, symbol L represents leaning of the air-fuel mixture supplied to the engine, while symbol F/C represents fuel cut. Further, the numbers M on the abscissa designate cylinders in such a manner that M = 1 corresponds to a cylinder into which fuel should be first injected after the start of the traction control, and M = 2 to 6 corresponds to respective cylinders into which fuel should be sequentially injected in the order shown by the number. For example, in the case of the TC level = LVL0, the air-fuel ratio of the mixture supplied to all the respective cylinders is leaned, and in the case of the TC level = LVL3, the cylinders corresponding to M = 1, 3, and 5 are subjected to fuel cut while the other cylinders (corresponding to M = 2, 4, and 6) are subjected to leaning of the air-fuel ratio.

In addition, LVLN appearing in FIG. 5 shows that no traction control should be carried out, i.e. the ordinary fuel supply control should be carried out.

Referring again to FIG. 3, fuel supply control responsive to the TC level selected at the step S5 is carried out at a step S11 referred to hereinafter. At steps S6 to S9, it is determined whether or not traction control can be carried out by determining whether there are abnormalities other than those detected at the step S3.

At a step S6, it is determined whether or not a start-checking completion flag $F_{TCSIF}$ for showing completion of checking of the start of the TCS-ECU 20 is equal to 1. If the answer to this question is affirmative (Yes), i.e. if $F_{TCSIF} = 1$, which means that checking of the start of the TCS-ECU 20 has been completed, it is determined at a step S7 whether or not a start-checking OK flag $F_{TCSIOK}$ for showing that no abnormality has been detected by checking the start of the TCS-ECU 20 is equal to 1. In this connection, the start-checking completion flag $F_{TCSIF}$ and the start-checking OK flag $F_{TCSIOK}$ are set by a TCS-ECU start-checking subroutine referred to hereinafter and shown in FIG. 8.

If the answer to the question of the step S7 is affirmative (Yes), i.e. if $F_{TCSIOK} = 1$, which means that the results of checking the start of the TCS-ECU 20 are OK, it is determined at a step S8 whether or not a stop flag $F_{TCSTP}$ for showing that traction control should be immediately stopped is equal to 1. The stop flag $F_{TCSTP}$ is set by a TCSTB/TCFC intermediate value hold-checking subroutine shown in FIG. 9 and a TC stop-determining subroutine shown in FIG. 10.

If the answer to the question of the step S8 is negative (No), i.e. if $F_{TCSTP} = 0$, which means that traction control need not be stopped immediately, it is determined at a step S9 whether or not a TC condition flag $F_{TCENBL}$ for showing that conditions (hereinafter referred to as "the TC conditions") for carrying out traction control are satisfied is equal to 1. The TC condition flag $F_{TCENBL}$ is set to 1 when the engine is in a predetermined operating condition determined by the throttle valve opening $\theta_{TH}$, the engine rotational speed Ne, the engine coolant temperature $T_W$, the intake air temperature $T_A$, etc.

If one of the answers to the questions of the steps S6, S7, and S9 is negative (No), or if the answer to the question of the step S8 is affirmative (Yes), i.e. if $F_{TCSIF} = 0$, which means that the checking of the start of the TCS-ECU 20 has not been completed, or if $F_{TCSIOK} = 0$, which means that the results of checking the start of the TCS-ECU 20 are no good (i.e. abnormality has been detected), or if $F_{TCSTP} = 1$, which means that traction control should be immediately stopped, or if $F_{TCENBL} = 0$, which means that the TC conditions are not satisfied, the TC level is set to LVLN at the step S12, whereby normal fuel supply control is carried out at the step S13.

On the other hand, if the program proceeds from the step S6 through the steps S7 and S8 to the step S9, and the answer to the question of the step S9 is affirmative (Yes), i.e. if $F_{TCENBL} = 1$, which means that the TC conditions are satisfied, it is determined at a step S10 whether or not the TC level has been set to LVLN. If the answer to this question is affirmative (Yes), i.e. if the TC level has been set to LVLN, the program proceeds to the step S13, whereas if the answer is negative (No), i.e. if the TC level has been set to any one of LVL0 to LVL6, leaning of the air-fuel mixture or fuel cut is carried out in accordance with the TC level at a step S11. Leaning of the air-fuel mixture is effected by applying a value of the basic fuel amount Ti read from the traction control Ti map to the above-mentioned equation (1). Further, the ignition timing may be advanced or retarded in accordance with the engine rotational speed Ne, at the same time of leaning of the air-fuel mixture.

If the answer to the question of the step S4 is affirmative (Yes), i.e. if $F_{TCFC1} = 1$, which means that the possible abnormality of the TCFC line has been detected, it is determined at a step S14 whether or not the start-checking OK flag $F_{TCSIOK}$ is equal to 1. If the answer to this question is negative (No), i.e. if $F_{TCSIOK} = 0$, which means that the results of checking of the start of the TCS-ECU 20 are no good, the TC level is set to LVLN at a step S15, and the program proceeds to the step S6, whereas if the answer to the question of the step S14 is affirmative (Yes), i.e. if $F_{TCSIOK} = 1$, which means that the results of checking of the start of the TCS-ECU 20 are OK, a TC level-selecting subroutine to be executed during failure of the TCFC line is carried out at a step S16 to determine a TC level, and then the program proceeds to the step S8.

Figure 7:
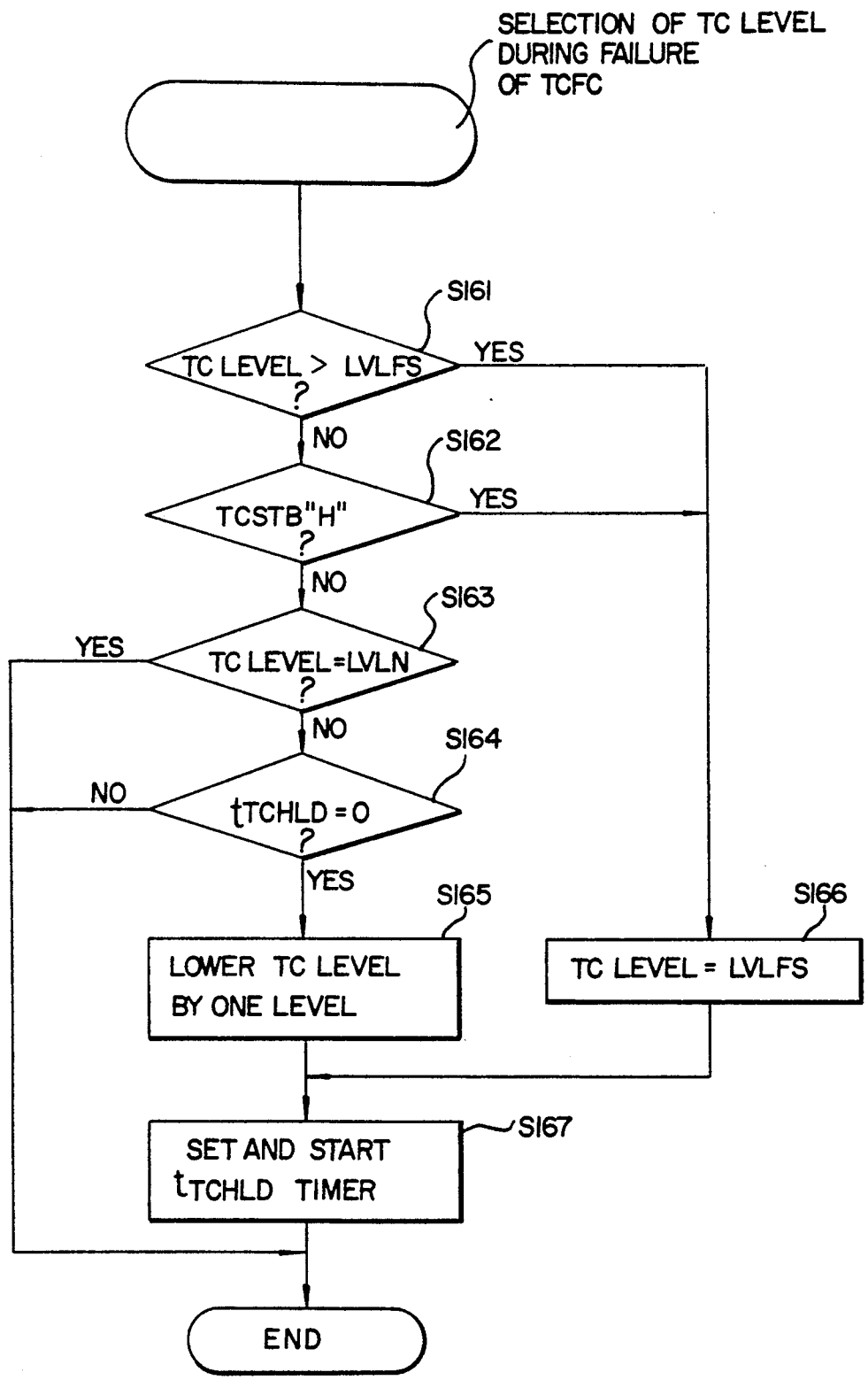
FIG. 7 is a flowchart of a program for selecting a TC level when abnormality of the TCFC line is detected.

FIG. 7 shows the TC level-selecting subroutine to be carried out at the step S16 during failure of the TCFC line.

At a step S161, it is determined whether or not the TC level predetermined based on the slip level $S_{LVL}$ as shown in FIG. 5 is higher than a predetermined level LVLFS (e.g. LVL2), i.e. whether the TC level is on a side at which engine output should be reduced to a larger degree. If the answer to this question is negative (No), i.e. TC level≦LVLFS, it is determined at a step S162 whether or not the slip status signal on the TCSTB line is at high level. If either of the answers to the questions of the steps S161 and S162 is affirmative (Yes), i.e. if TC level>LVLFS or if the slip status signal is at high level, the TC level is set to LVLFS at a step S166, and a $t_{TCHLD}$ timer is set to a predetermined time period $t_{TCHLD}$ (e.g. 3 seconds) and started at a step S167, followed by terminating the present subroutine.

If both the answers to the questions of the steps S161 and S162 are negative (No), i.e. if TC level≦LVLFS and at the same time the slip status signal is at low level, it is determined at a step S163 whether the TC level is equal to LVLN. If the answer to this question is affirmative (Yes), i.e. if TC level=LVLN, the present subroutine is immediately terminated, whereas if the answer is negative (No), i.e. if TC level is equal to any of LVLO to LVLFS, it is determined at a step S164 whether the count value of the $t_{TCHLD}$ timer is equal to 0. If the answer to this question is negative (No), i.e. if the predetermined time period $t_{TCHLD}$ has not elapsed, the present subroutine is immediately terminated, whereas if the answer is affirmative (Yes), i.e. if the predetermined time period $t_{TCHLD}$ has elapsed, the TC level is lowered by one level at a step S165, and then the program proceeds to the step S167. To lower the TC level by one level means, for example, changing the TC level from LVL2 to LVL1.

The present subroutine is executed on condition that both the answers to the questions of the steps S4 and S14 in FIG. 3 are affirmative, i.e. on condition that a possible abnormality of the TCFC line has been detected ($F_{TCFC1}=1$) and that the results of checking of the start of the TCS-ECU are OK. If traction control is not being carried out (i.e. if TC level=LVLN), the TC level is held at LVLN. If traction control is being carried out, the TC level is set in the following manner:

(1) The TC level is immediately set to LVLFS, and held at LVLFS so long as the slip status signal on the TCSTB line is at high level.

(2) If the slip status signal is at low level, the TC level is stepwise lowered by one level upon each lapse of the predetermined time period $t_{TCHLD}$ to LVLN (in the case of LVLFS=LVL2, the TC level is progressively changed from LVL2 through LVL1 and LVL0 to LVLN).

In this connection, the predetermined level LVLFS is set at such a level (e.g. LVL2) that even if the TC level is held at the level, the vehicle can run at a speed of 60 to 100 km/h when the engine is operated at the maximum output that is obtained at this level of the TC level.

Thus, even if the possible abnormality of the TCFC line is detected during traction control, traction control at a predetermined level (LVLFS) is continued based on the slip status signal transmitted through the TCSTB line to thereby secure controllability of the vehicle. Further, if the slip status signal is at low level to show that an excessive slip state of the driving wheels is dissipated, the output torque of the driving wheels is progressively increased so that the driveability of the vehicle is not degraded to thereby relieve burden on the driver.

Further, the manner of checking the start of the TCS-ECU 20 and the manner of setting the stop flag $F_{TCSTP}$ for showing that traction control should be immediately stopped will be described below.

Figure 8:
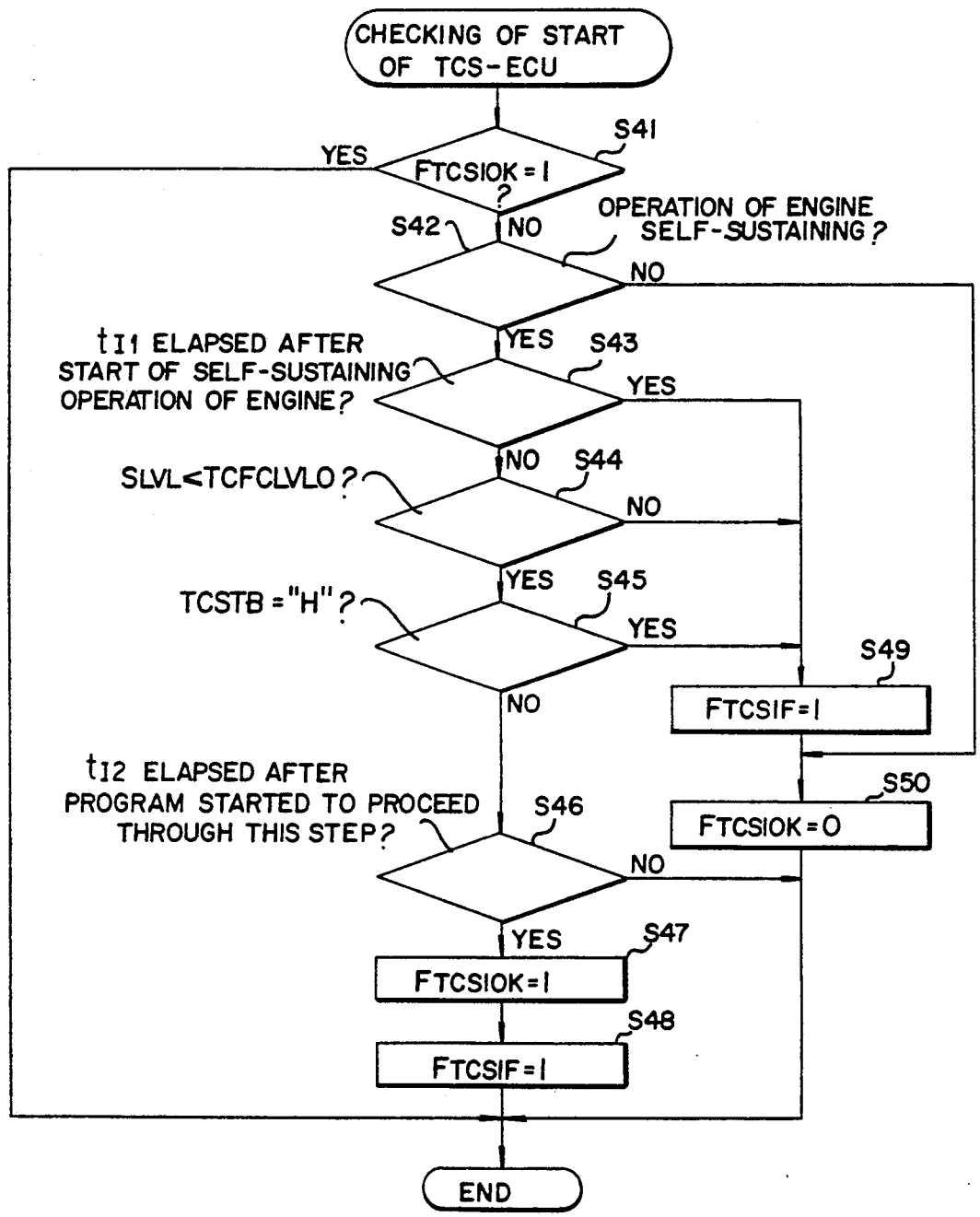
FIG. 8 is a flowchart of a program for checking the start of the TCS-ECU.

FIG. 8 shows the TCS-ECU start-checking subroutine. The present subroutine is carried out as background processing, and therefore starts to be carried out upon turning-on of the ignition switch.

At a step S41, it is determined whether or not the start-checking OK flag $F_{TCSIOK}$ has been set to 1. If the answer to this question is affirmative (Yes), i.e. if $F_{TCSIOK}=1$, the present subroutine is immediately terminated, whereas if the answer is negative (No), i.e. if $F_{TCSIOK}=0$, it is determined at a step S42 whether or not the operation of the engine is self-sustaining. If the answer to this question is affirmative, i.e. if the operation of the engine is self-sustaining, it is determined at a step S43 whether or not a first predetermined time period $t_{f1}$ (e.g. 5 seconds) has elapsed after the self-sustaining operation of the engine started. If the answer to this question is negative (No), i.e. if the first predetermined time period $t_{f1}$ has not elapsed, it is determined at a step S44 whether or not the slip level $S_{LVL}$ is lower than the first predetermined value TCFCLVLO for determining the TC level. If the answer to this question is affirmative (Yes), i.e. if $S_{LVL}<$TCFCLVLO, it is determined at a step S45 whether or not the slip status signal on the TCSTB line is at high level. Since the TCS-ECU 20 supplies, immediately after the start of the self-sustaining operation of the engine, signals for setting the TC level to LVLN to the TCFC line and TCSTB line, respectively, i.e. an off-duty hold signal (a slip level signal having a duty ratio thereof held at such a value as to obtain $S_{LVL}<$TCFCLVLO) and a low level hold signal (a slip status signal which is held at low level), it is determined that the TCS-ECU 20 is normally functioning if the answer to the question of the step S44 is affirmative (Yes) and at the same time the answer to the question of the step S45 is negative (No), i.e. if $S_{LVL}<$TCFCLVLO and at the same time TCSTB="L" (low level), and then the program proceeds to a step S46. At the step S46, it is determined whether a second predetermined time period $t_{f2}$ (e.g. 0.5 seconds) has elapsed after the program started to proceed through the step S46. If the answer to this question is negative (No), i.e. if the second predetermined time period $t_{f2}$ has not elapsed, the present subroutine is immediately terminated, whereas if the answer is affirmative (Yes), i.e. if the second predetermined time period $t_{f2}$ has elapsed, the start-checking OK flag $F_{TCSIOK}$ is set to 1 at a step S47, and the start-checking completion flag $F_{TCSIF}$ is set to 1 at a step S48, followed by terminating the present subroutine.

If the answer to the question of the step S42 is negative (No), i.e. if the operation of the engine is not self-sustaining, the start-checking OK flag $F_{TCSIOK}$ is set to 0 at a step S50, followed by terminating the present program. If the answer to the question of the step S43 is affirmative (Yes), or if the answer to the question of the step S44 is negative (No), or if the answer to the question of the step S45 is affirmative (Yes), i.e. if the first predetermined time period $t_{f1}$ has elapsed after the start of self-sustaining operation of the engine, or if $S_{LVL}≧$TCFCLVLO, or if TCSTB="H" (high level), it is judged that the TCS-ECU 20 is abnormal and the start-checking completion flag $F_{TCSIF}$ is set to 1 at a step S49, and the start-checking OK flag $F_{TCSIOK}$ is set to 0 at the step S50, followed by terminating the present subroutine.

According to the above described start-checking subroutine, if the conditions of $S_{LVL}<$TCFCLVLO and TCSTB="L" are satisfied before the first predetermined time period $t_{l1}$ has elapsed after the start of self-sustaining operation of the engine, and if this state has continued over the second predetermined time period, it is determined that the TCS-ECU 20 has been normally started (the results of checking of the start of the TCS-ECU 20 are OK, i.e. $F_{TCSIOK}=1$), whereas in cases other than the above, it is determined that the TCS-ECU has not been normally started (the results of checking of the start of the TCS-ECU 20 are no good ($F_{TCSIOK}=0$). Further, if the checking of the start of the TCS-ECU 20 is completed, the start-checking completion flag $F_{TCSIF}$ is set to 1 irrespective of whether the results of checking of the start of the TCS-ECU 20 are OK or no good.

Figure 9A:
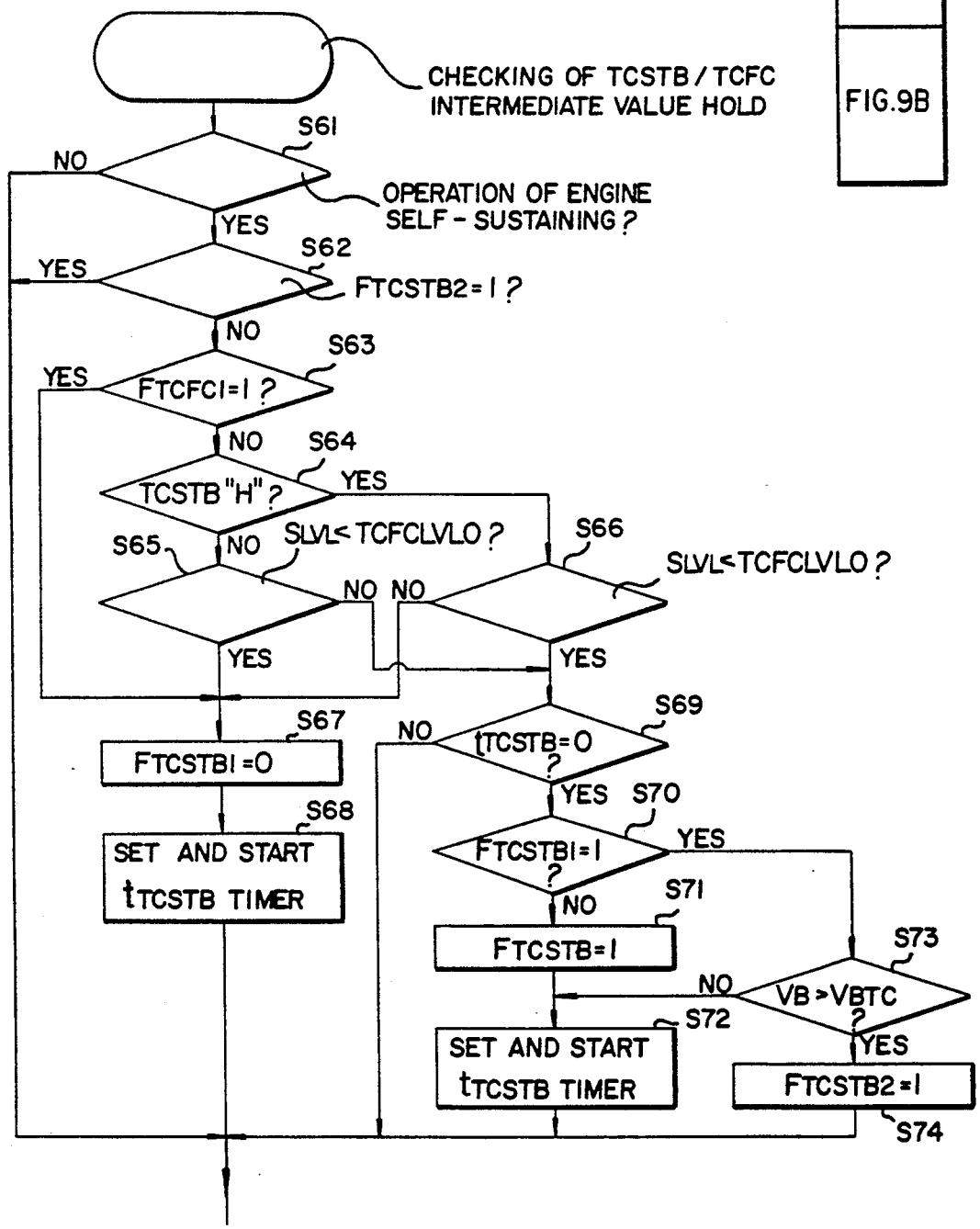
Figure 9B:
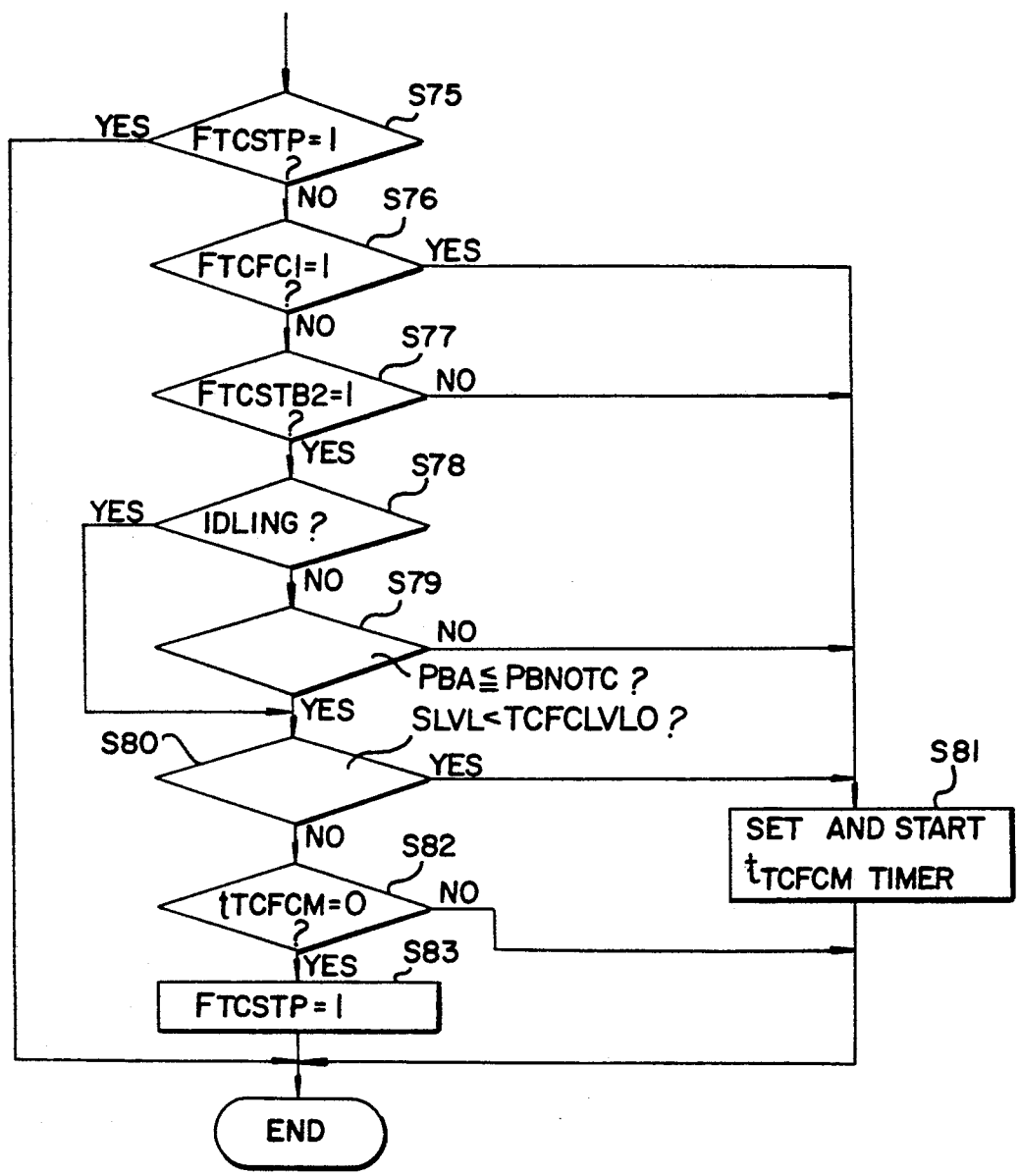

FIG. 9 shows the TCSTB/TCFC intermediate value hold-checking subroutine for checking the TCSTB line and the intermediate value hold abnormality of the TCFC line. Similarly to the above described TCS-ECU start-checking subroutine, this program is executed in the background.

At a step S61, it is determined whether or not the operation of the engine 1 is self-sustaining. If the answer to this question is affirmative (Yes), i.e. if the operation of the engine 1 is self-sustaining, it is determined at a step S62 whether or not a second TCSTB flag $F_{TCSTB2}$, which is set to 1 at a step S74 referred to hereinafter for showing that abnormality of the TCSTB line has been determinately detected, is equal to 1. If the answer to the question of the step S61 is negative (No) or the answer to the question of the step S62 is negative (No), i.e. if the operation of the engine is not self-sustaining or $F_{TCSTB2}=1$, the program immediately proceeds to a step S75, whereas if the answer to the question of the step S61 is affirmative (Yes) and at the same time the answer to the question of the step S62 is negative (No), i.e. if the operation of the engine 1 is self-sustaining and at the same time $F_{TCSTB2}=0$, it is determined at a step S63 whether or not the first TCFC flag $F_{TCFC1}$ for showing the possible abnormality of the TCFC line is equal to 1. If the answer to this question is affirmative (Yes), i.e. if $F_{TCFC1}=1$, the program immediately proceeds, without checking whether the slip level signal transmitted through the TCFC line and the slip status signal transmitted through the TCSTB line are contradictory (which checking is carried out at steps S64 to S66), to a step S67, where a first TCSTB flag $F_{TCSTB1}$ is set to 0. Then, a $t_{TCSTB}$ timer is set to a predetermined time period $t_{TCSTB}$ (e.g. 0.3 seconds) and started at a step S68, followed by the program proceeding to the step S75.

If the answer to the question of the step S63 is negative (No), i.e. if $F_{TCFC1}=0$, it is determined at a step S64 whether the slip status signal transmitted through the TCSTB line is at high level ("H"). In both the cases where the answer to this question is affirmative (Yes) or negative (No), it is determined at steps S65 and S66 whether or not the slip level $S_{LVL}$ is lower than the first predetermined value TCFCLVLO. If the answer to the question of the step S64 is negative (No) and the answer to the question of the step S65 is affirmative (Yes), or if the answer to the question of the step S64 is affirmative (Yes) and the answer to the question of the step S66 is negative (No), i.e. if TCSTB="L" and $S_{LVL}<$TCFCLVLO, or if TCSTB="H" and $S_{LVL}\geq$TCFCLVLO, it is judged that the TCSTB line is normal, since the slip level signal transmitted through the TCFC line and the slip status signal transmitted through the TCSTB line are not contradictory to each other (see FIG. 5), and the program proceeds to the step S67.

On the other hand, if both the answers to the questions of the steps S64 and S65 are negative (No), or if both the answers to the questions of the steps S64 and S66 are affirmative (Yes), i.e. if TCSTB="L" and $S_{LVL}\geq$TCFCLVLO, or if TCSTB="H" and $S_{LVL}<$TCFCLVLO, it is judged that there is a possibility of abnormality of the TCSTB line, since the slip level signal transmitted through the TCFC line and the slip status signal transmitted through the TCSTB line are contradictory to each other (since the first TCFC flag $F_{TCFC1}$ for showing a possible abnormality of the TCFC line is equal to 0), and the program proceeds to a step S69. At the step S69, it is determined whether or not the count value of the $t_{TCSTB}$ timer started at the step S68 or at a step S72 referred to hereinafter is equal to 0. If the answer to this question is negative (No), i.e. if $t_{TCSTB}>0$, the program immediately proceeds to a step S75.

If the answer to the question of the step S69 is affirmative (Yes), i.e. if the predetermined time period $t_{TCSTB}$ has elapsed after the aforementioned detection of contradiction between the slip level signal and the slip status signal, it is determined at a step S70 whether or not the first TCSTB flag $F_{TCSTB1}$ is equal to 1. If the answer to this question is negative (No), i.e. if $F_{TCSTB1}=0$, the first TCSTB flag $F_{TCSTB1}$ is set to 1 at a step S71 for showing detection of a possible abnormality of the TCSTB line, and the $t_{TCSTB}$ timer is set to a predetermined time period (e.g. 0.3 seconds) and started at a step S72, followed by the program proceeding to the step S75. If the answer to the question of the step S70 is affirmative (Yes), i.e. if $F_{TCSTB1}=1$, it is determined at a step S73 whether the battery voltage $V_B$ is higher than the predetermined voltage $V_{BTC}$. This determination is carried out for the same purposes as in the TCFC-checking subroutine (FIG. 4), and if the answer to this question is affirmative (Yes), i.e. if $V_B>V_{BTC}$, the second TCSTB flag $F_{TCSTB2}$ for showing that detection of abnormality of the TCSTB line is determinate is set to 1 at a step S74, followed by the program proceeding to the step S75, whereas if the answer is negative (No), i.e. if $V_B\leq V_{BTC}$, the program proceeds to the step S72.

The above described steps S61 to S74 are for checking the TCSTB line. According to this part of the subroutine, if the TCFC line is normal ($F_{TCFC1}=0$), and at the same time it is detected that the slip level signal transmitted through the TCFC line and the slip status signal transmitted through the TCSTB line are contradictory to each other, the first TCSTB flag $F_{TCSTB1}$ is set to 1 (detection of the possible abnormality of the TCSTB line) after the predetermined time period $t_{TCSTB}$ has elapsed after the detection of the contradiction. Further, after the predetermined time period $t_{TCSTB}$ has elapsed after detection of the possible abnormality of the TCSTB line, the second TCSTB flag $F_{TCSTB2}$ is set to 1 (which means determinate detection of abnormality of the TCSTB line). In contrast to the first TCFC flag $F_{TCFC1}$ for showing the possible abnormality of the TCFC line, which is set to 1 immediately when it is detected that the value of the slip level $S_{LVL}$ is not within the predetermined range, the first TCSTB flag $F_{TCSTB1}$ for showing the possible abnormality of the TCSTB line is set to 1 after the predetermined time period $t_{TCSTB}$ has elapsed after detection of contradiction between the slip level signal and the slip status signal. This is because in detecting abnormality of the TCFC line, rapidity is made much of, while in detecting abnormality of the TCSTB line, certainty is made much of.

At steps S75 et seq., the intermediate value hold abnormality of the TCFC line is checked. Specifically, if an undesired oscillating signal intrudes into the TCFC line to thereby hold the slip level $S_{LVL}$ indicated by the slip level signal on the TCFC line at an intermediate value (i.e. the slip level $S_{LVL}$ is within the predetermined range defined by the upper and lower limit values), it is impossible to determine the abnormality (the intermediate value hold abnormality) by the TCFC-checking subroutine (FIG. 4). Therefore, after completion of checking of the TCSTB line, the TCFC line is checked again.

Figure 10:
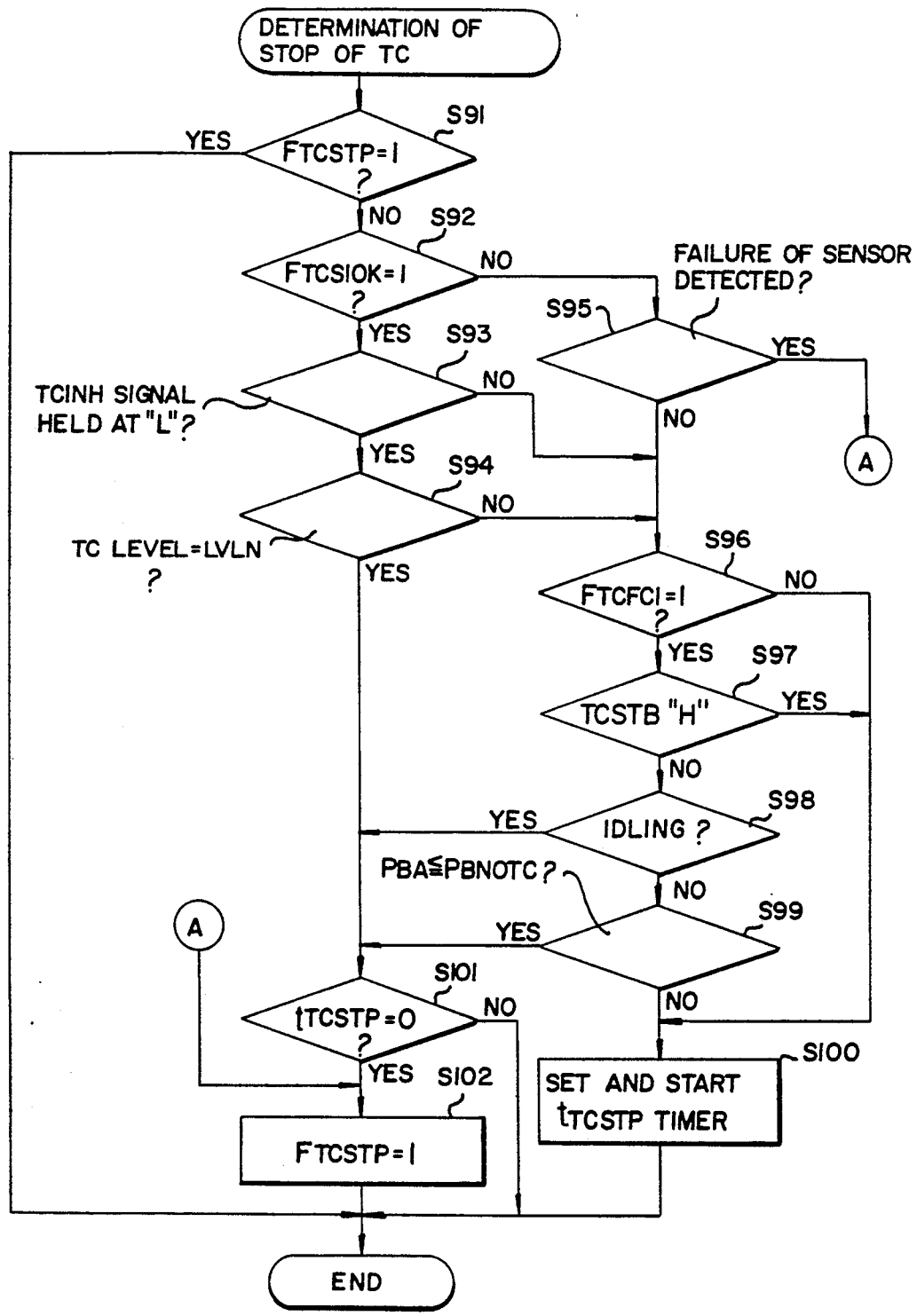
FIG. 10 is a flowchart of a program for determining whether traction control should be inhibited.

At the step S75, it is determined whether or not the stop flag $F_{TCSTP}$, which is set to 1 at a step S83 referred to hereinafter or by the TC stop-determining subroutine of FIG. 10, is equal to 1. If the answer to this question is affirmative (Yes), i.e. if the stop flag $F_{TCSTP}$ has already been set to 1, the present subroutine is immediately terminated. If the answer to the question of the step S75 is negative (No), i.e. if $F_{TCSTP}=0$, it is determined at a step S76 whether or not the first TCFC flag $F_{TCFC1}$ is equal to 1. If the answer to this question is negative (No), i.e. if $F_{TCFC1}=0$, it is determined at a step 77 whether or not the second TCSTB flag $F_{TCSTB2}$ is equal to 1. If the answer to the question of the step S76 is negative (No) and at the same time the answer to the question of the step S77 is affirmative (Yes), i.e. if $F_{TCFC1}=0$ and $F_{TCSTB2}=1$, which means that no abnormality has been detected by the TCFC-checking subroutine and at the same time abnormality of the TCSTB line has been determinately detected, determinations at steps S78 et seq. are carried out.

At a step S78, it is determined whether or not engine 1 is idling. This determination is carried out, e.g. by determining whether or not the throttle valve is substantially fully closed and at the same time the engine rotational speed Ne is within a predetermined low rotational speed range. If the answer to the question of the step S78 is affirmative (Yes), i.e. if the engine is idling, the program immediately proceeds to a step S80, whereas if the answer is negative, i.e. if the engine is not idling, it is determined at a step S79 whether or not the intake pipe absolute pressure $P_{BA}$ is not higher than a predetermined value $P_{BNOTC}$ (e.g. 300 mmHg). If the answer to this question is affirmative (Yes), i.e. if $P_{BA} \leq P_{BNOTC}$, it is judged that the engine 1 is decelerating, and the program proceeds to the step S80. The predetermine value $P_{BNOTC}$ may be set as a function of the engine rotational speed Ne in such a manner that it corresponds to no load condition of the engine. By so setting, the accelerating condition of the engine can be more rapidly detected. At the step S80, it is determined whether or not the slip level $S_{LVL}$ is lower than the first predetermined value TCFCLVLO.

If the answer to the question of the step S76 is affirmative (Yes), or if the answer to the question of the step S77 or S79 is negative (No), or if the answer to the question of the step S80 is affirmative (Yes), i.e. if $F_{TCFC1}=1$, which means that the possible abnormality of the TCFC line has been detected, or if $F_{TCSTB2}=0$, which means that abnormality of the TCSTB line has not been determinately detected, or if the engine is in a condition other than the idling and decelerating conditions, or if $S_{LVL}<$ TCFCLVLO, which means that the slip level $S_{LVL}$ indicated by the slip level signal transmitted through the TCFC line does not assume an intermediate value, it is judged that it is impossible to detect the intermediate value hold abnormality of the TCFC line or that there is no intermediate value hold abnormality of same, and then a $t_{TCFCM}$ timer is set to a predetermined time period $t_{TCFCM}$ (e.g. 3 seconds) and started at a step S81, followed by terminating the present subroutine.

On the other hand, if the program proceeds from the step S76 through the steps S77 to S79, or from the step S76 through the steps S77 and S78, to the step S80, and the answer to the question of the step S80 is negative (No), i.e. (1) if $F_{TCFC1}=0$, which means that no abnormality has been detected by the TCFC-checking subroutine, (2) if $F_{TCSTB2}=1$, which means that abnormality of the TCSTB line has been determinately detected, (3) if the engine is idling or decelerating, and (4) if $S_{LVL} \geq$ TCFCLVLO, it is judged that there is a possibility of occurrence of the intermediate value hold abnormality of the TCFC line, and it is determined at a step S82 whether or not the count value of the $t_{TCFCM}$ timer started at the step S81 is equal to 0. If the answer to this question is negative (No), i.e. if the predetermined time period $t_{TCFCM}$ has not elapsed, the present subroutine is terminated, whereas if the answer is affirmative (Yes), i.e. if the predetermined time prediod $t_{TCFCM}$ has elapsed, it is judged that the intermediate value hold abnormality has occurred on the TCFC line, and the stop flag $F_{TCSTP}$ is set to 1, followed by terminating the present program.

According to the above described steps S75 to S83, when the above conditions (1) to (4) determined at the steps S76 to S80 have all continued to be satisfied over the predetermined time period, the intermediate value hold abnormality of the TCFC line is detected, and the stop flag $F_{TCSTP}$ is set to 1 in order to immediately stop traction control. This manner of detection of the intermediate value hold abnormality of the TCFC line is based on the fact that when the engine is in the idling or decelerating condition (the above condition (3)), a slip state of the driving wheels cannot take place, i.e. it is impossible for the slip level $S_{LVL}$ to assume a value equal to or higher than the first predetermined value TCFCLVLO (the above condition (4)). And in addition, satisfaction of the above conditions (1) and (2) is determined to thereby more positively detect the intermediate value hold abnormality of the TCFC line.

When the intermediate value hold abnormality is detected, it has already been determined that the engine is idling or decelerating and no traction control is being carried out, so that the stop flag $F_{TCSTP}$ is immediately set to 1.

Further, even if $F_{TCSTB2}=1$, which means that abnormality of the TCSTB line has been determinately detected, so long as the intermediate value hold abnormality of the TCFC line is not detected during idling or decelerating of the engine, traction control responsive to the slip level signal and hence the slip level $S_{LVL}$ is continued, which makes it possible to secure controllability of the vehicle and to avoid the inconveniences resulting from the instantaneous stop of traction control, i.e. a sudden increase in the torque of the driving wheels, and the resulting increase in the burden on the driver.

FIG. 10 shows a TC stop-determining subroutine for determining whether or not traction control should be immediately stopped. In this subroutine as well, setting of the stop flag $F_{TCSTP}$ is carried out. This program is also carried out in the background.

At a step S91, it is determined whether or not the stop flag $F_{TCSTP}$ has already been set to 1. If the answer to this question is affirmative (Yes), i.e. if $F_{TCSTP}=1$, the present subroutine is immediately terminated. If the answer to the question of the step S91 is negative (No), i.e. if $F_{TCSTP}=0$, it is determined at a step S92 whether or not the start-checking OK flag $F_{TCSIOK}$ for showing that no abnormality has been detected by checking the start of the TCS-ECU 20 is equal to 1. If the answer to this question is negative (No), i.e. if $F_{TCSIOK}=0$, which means that abnormality of the TCS-ECU 20 has been detected by the start-checking subroutine (FIG. 8), it is determined at a step S95 whether or not abnormality of any of the sensors for detecting operating conditions of the engine (i.e. the throttle valve opening sensor 4, intake pipe absolute pressure sensor 8, intake air temperature sensor 9, engine coolant temperature sensor 10, engine rotational speed sensor 11, cylinder-discriminating sensor 12, etc.) has been detected. If the answer to this question is affirmative (Yes), i.e. if abnormality of any of the above sensors has been detected, the stop flag $F_{TCSTP}$ is immediately set to 1 at a step S102, followed by terminating the present subroutine. On the other hand, if the answer to the question of the step S95 is negative (No), i.e. if no abnormality of any of the sensors has been detected, the program proceeds to a step S96.

If the answer to the question of the step S92 is affirmative (Yes), i.e. if $F_{TCSIOK}=1$, which means that the results of checking of the start of the TCS-ECU 20 are OK, it is determined at a step S93 whether or not a TC instruction signal transmitted through the TCINH line (third signal line) is held at low level. The TC instruction signal is determined by a subroutine of FIG. 11 referred to hereinafter, and held at low level, when abnormality of the TCFC line or any other abnormality described above is detected, in order to inhibit traction control. If the answer to this question is affirmative (Yes), i.e. if the TC instruction signal is held at low level to inhibit traction control, it is determined at a step S94 whether or not the TC level is equal to LVLN. If both the answers to the questions of the steps S93 and S94 are affirmative, i.e. if the TC instruction signal is held at low level and at the same time TC level=LVLN, it is judged that traction control should be stopped, and the program proceeds to a step S101, whereas if either of the answers to the questions of the steps S93 and S94 is negative (No), i.e. if the TC instruction signal is not held at low level or the TC level is not equal to LVLN, the program proceeds to a step S96.

At the step S96, it is determined whether or not the first TCFC flag $F_{TCFC1}$ for showing the possible abnormality of the TCFC line is equal to 1. If the answer to this question is affirmative (Yes), i.e. if $F_{TCFC1}=1$, it is determined at a step S97 whether or not the slip status signal transmitted through the TCSTB line is at high level. If the answer to the question of the step S96 is negative (No), or if the answer to the question of the step S97 is affirmative (Yes), i.e. if $F_{TCFC1}=0$, or TCSTB="H", it is judged that traction control need not be stopped or should not be stopped, and a $t_{TCSTP}$ timer is set to a predetermined time period $t_{TCSTP}$ and started at a step S100, followed by terminating the present subroutine.

If the answer to the question of the step S96 is affirmative (Yes) and at the same time the answer to the question of the step S97 is negative (No), i.e. if $F_{TCFC1}=1$ and TCSTB="L", it is determined at a step S98 whether or not the engine is idling. If the answer to this question is negative (No), i.e. if the engine is not idling, it is determined at a step S99 whether or not the intake pipe absolute pressure $P_{BA}$ is not higher than the predetermined value $P_{BNOTC}$. If both the answers to the questions of the steps S98 and S99 are negative (No), i.e. if the engine 1 is neither idling nor decelerating, the program proceeds to the step S100 and setting of the stop flag $F_{TCSTP}$ to 1 is not carried out. If either of the answers to the questions of the steps S98 and S99 is affirmative, i.e. if the engine 1 is idling or decelerating, it is determined at a step S101 whether or not the count value of the $t_{TCSTP}$ timer is equal to 0. If the answer to this question is negative (No), i.e. if the predetermined time period $t_{TCSTP}$ has not elapsed, the present subroutine is immediately terminated, whereas if the answer is affirmative (Yes), i.e. if the predetermined time period $t_{TCSTP}$ has elapsed, the stop flag $F_{TCSTP}$ is set to 1, followed by terminating the present subroutine.

According to the TC stop-determining subroutine described above, when abnormality of any of the TCSECU 20, the TCFC line, and the TCSTB line is detected, the stop flag $F_{TCSTP}$ is set to 1 after a state in which clearly traction control is not being carried (i.e. a state of TC level=LVLN or idling or decelerating of the engine 1) has continued over the predetermined time period $t_{TCSTP}$. This is because if traction control is immediately terminated when abnormality of the above devices is detected during traction control, the output of the engine can rapidly increase to degrade the driveability of the vehicle. This inconvenience can be avoided by setting the stop flag $F_{TCSTP}$ in the above described manner.

Figure 11:
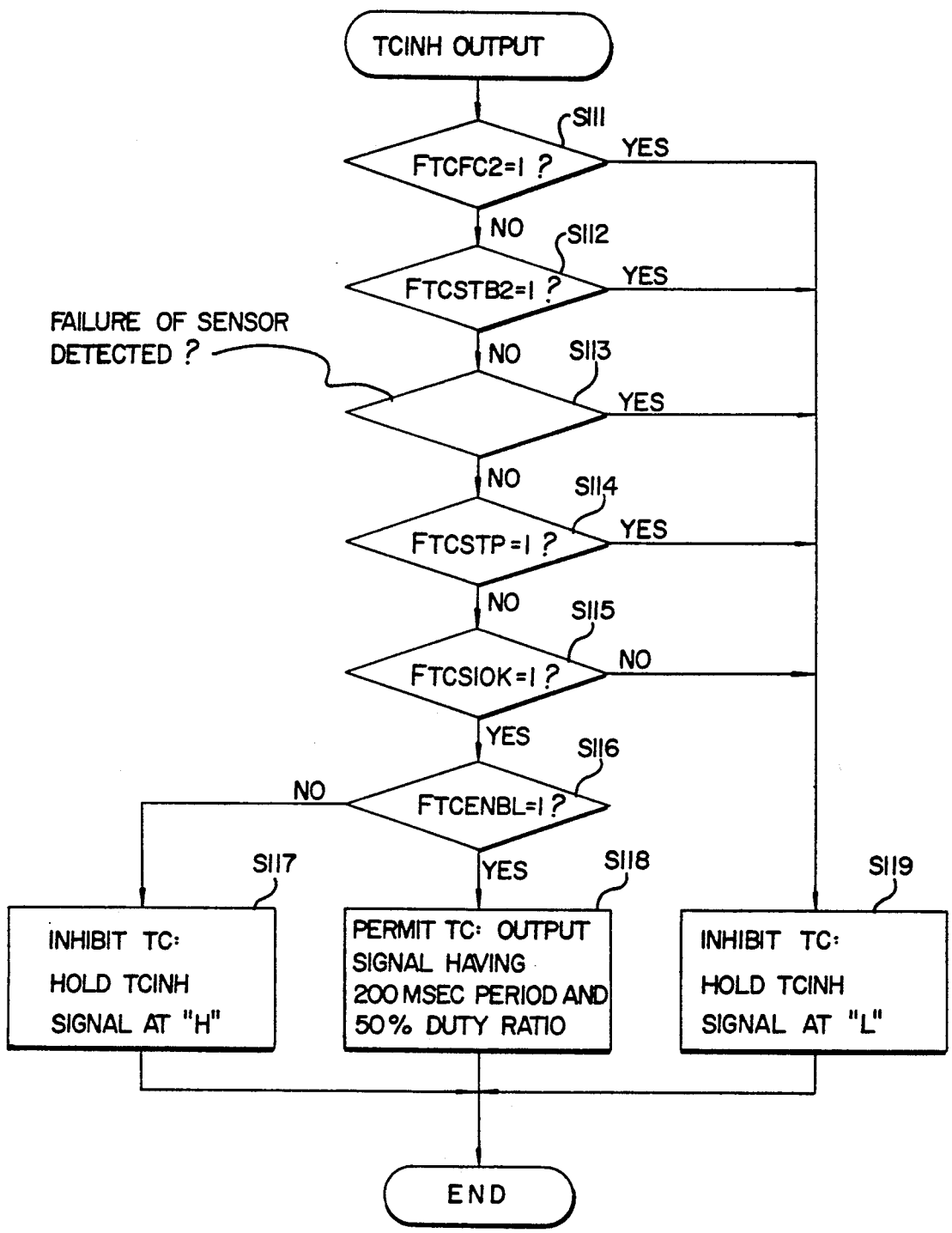
FIG. 11 is a flowchart of a program for controlling a signal to be transmitted along a third signal line (TCINH line) within the driving wheel slip control system.

FIG. 11 shows a TCINH output subroutine for controlling the output of the TC instruction signal to be supplied from the ENG-ECU 5 to the TCS-ECU 20 by way of the TCINH line. This program is executed upon each lapse of a predetermined time period (e.g. 10 msec).

At a step S111, it is determined whether the second TCFC flag $F_{TCFC2}$ is equal to 1. If the answer to this question is negative (No), i.e. if $F_{TCFC2}=0$, it is determined at a step S112 whether or not the second TCSTB flag $F_{TCSTB2}$ is equal to 1. If the answer to this question is negative (No), i.e. if $F_{TCSTB2}=0$, it is determined at a step S113 whether or not abnormality of any of the aforementioned sensors for detecting operating conditions of the engine has been detected. If the answer to this question is negative (No), i.e. if no abnormality of any of the sensors has been detected, it is determined at a step S114 whether or not the stop flag $F_{TCSTP}$ is equal to 1. If the answer to this question is negative (No), i.e. if $F_{TCSTP}=0$, it is determined at a step S115 whether or not the start-checking OK flag $F_{TCSIOK}$ is equal to 1.

If an answer to any of the questions of the steps S111 to S114 is affirmative or the answer to the question of the step S115 is negative (No), i.e. if $F_{TCFC2}=1$, which means that abnormality of the TCFC line has been determinately detected, or if abnormality of any of the sensors for detecting operating conditions of the engine has been detected, or if $F_{TCSTP}=1$, which means that traction control should be immediately stopped, or if $F_{TCSIOK}=0$, which means that the results of checking of the start of the TCS-ECU 20 are no good, it is judged that traction control should be inhibited due to occurrence of abnormality in the driving wheel slip control system or the sensors, and the TC instruction signal is held at low level at a step S119.

On the other hand, if all the answers to the questions of the steps S111 to S114 are negative (No), and the answer to the question of the step S115 is affirmative (Yes), i.e. if all the following conditions (1) to (5) are satisfied, it is determined at a step S116 whether or not a TC condition flag set based on detected operating conditions of the engine is equal to 1:

(1) Detection of abnormality of the TCFC line is not determinate (i.e. $F_{TCFC2}=0$).

(2) Detection of abnormality of the TCSTB line is not determinate (i.e. $F_{TCSTB2}=0$).

(3) No abnormality of any of the sensors for detecting operating conditions of the engine has been detected.

(4) It is not required to immediately stop traction control (i.e. $F_{TCSTP}=0$).

(5) The results of checking of start of the TCS-ECU 20 are OK (i.e. $F_{TCSIOK}=0$).

Even if the above conditions (1) to (5) are all satisfied, if the answer to the question of the step S116 is negative (No), this means that the TC conditions are not satisfied (i.e. the engine is in a condition in which traction control should not be carried out) although no abnormality has occurred in the control system. To show this, the TC instruction signal is held at high level at a step S117 to thereby send instructions for inhibition of traction control to the TCS-ECU 20.

Further, if all the above conditions (1) to (5) are satisfied and at the same time the answer to the question of the step S116 is affirmative (Yes), i.e. if the TC consitions are also satisfied, it is judged that traction control can be carried out, and the TC instruction signal is supplied in the form of a pulse signal having a pulse repetition period of 200 msec. and a duty ratio of 50% (step S118).

FIGS. 12a to 12c show examples of control carried out by the control circuit 206 (FIG. 2) of the TCS-ECU 20 based on the TC instruction signal outputted as above. In the figures, $t_0$ indicates a time point at which the ignition switch is turned on, and $t_2$ a time point at which the engine starts self-sustaining operation.

FIG. 12a shows a case in which traction control can be started at a time point $t_3$ after the start of self-sustaining operation of the engine. When the ignition switch is turned on at the time point $t_0$, the alarm lamp 15 and the off lamp 14 are immediately lighted. After the lapse of a predetermined time period (e.g. 2 seconds), the off lamp 14 goes out. Upon start of inputting of the pulse signal having a duty ratio of 50% as the TC instruction signal from the time point $t_3$ after the start of the self-sustaining operation of the engine, the alarm lamp 15 is put out (FIG. 12a, (3) and (4)). Lighting of the off lamp 14 over the predetermined time period is for checking the operation of thereof. The slip level signal is kept off duty and the slip status signal is held at low level (to indicate that the slip level $S_{LVL}<TCFCLVLO$) after turning-on of the ignition switch and until it is made sure at a time point $t_4$ that the TC instruction signal is generated as the pulse signal having a duty ratio of 50%. After the time point $t_4$, the state of keeping the slip level signal off duty and holding the slip status signal at low level is cancelled [i.e. the slip level signal and the slip status signal corresponding to the detected driving wheel speed and trailing wheel speed are generated (FIG. 12a, (2))].

FIG. 12b shows a case in which after the start of self-sustaining operation of the engine, traction control cannot be carried out due to the fact that the TC conditions are not satisfied ($F_{TCENBL}=0$), and can be carried out at and after a time point $t_5$. In this case, the alarm lamp 15 goes out at the time point $t_3$ after the start of self-sustaining operation of the engine when the TC instruction signal is changed from low level to high level (FIG. 12b, (3)). On the other hand, the off lamp 14 is kept on over the predetermined time period after turning-on of the ignition switch, thereafter lighted at the time point $t_4$ when it is made sure that the TC instruction signal is held at high level, and goes out at a time point $t_6$ when the TC instruction signal is changed to the pulse signal having a duty ratio of 50% (FIG. 12b, (4)). Thus, between the time points $t_4$ and $t_6$, the alarm lamp 15 is kept off whereas the off lamp 14 is kept on, to thereby indicate that traction control cannot be carried out due to the fact that the TC conditions are not satisfied. Further, until the time point $t_6$ when it is made sure that the TC instruction signal has been changed to the pulse signal having a duty ratio of 50%, the slip level signal is kept off duty and the slip status signal is held at low level, and after the time point $t_6$, the state of keeping the slip level signal off duty and holding the slip status signal at low level is cancelled (FIG. 12b, (2)).

FIG. 12c shows a case in which abnormality of the control system is detected after the start of self-sustaining operation of the engine. In this case, the TC instruction signal continues to be held at low level, and therefore the alarm lamp 15 is kept on (FIG. 12c, (3)). The off lamp 14 is kept on only over the predetermined time period after turning-on of the ignition switch (FIG. 12c, (4)). The slip level signal continues to be kept off duty and the slip status signal continues to be held at low level.

In addition, if it is made sure that the TC instruction signal is held at low level or high level, operations of the calculating circuits 201 to 205 may be inhibited.

As describe above, by controlling the lighting of the off lamp 14 and the alarm lamp 15 based on the TC instruction signal, it is possible for the driver to know whether traction control can be carried out, and further whether if traction control cannot be carried out, this is due to detection of abnormality of the control system or the fact that the TC conditions are not satisfied. As a result, the driver can respond to the situation properly. For example, the TC conditions are not satisfied until warming-up of the engine is completed. If this is the cause of inhibition of traction control, there is a high possibility of inhibition of traction control being cancelled by continuing the driving. Therefore, the driver can recognize that countermeasures, such as checking of a faulty part or repair thereof, are hardly required.

The following is a summing-up of abnormalities detected in this embodiment of the invention and manners of failsafe operation upon detection of the abnormalities.

A. Abnormalities to be detected

[1] Abnormalities of the TCS-ECU 20

(1) Abnormality of the TCS-ECU 20 itself is detected by the control circuit 206 within the TCS-ECU 20.

In this case, the slip level signal and the slip status signal are both held at high level. Accordingly; the ENG-ECU detects this abnormality as abnormality of the TCFC line, so that the first TCFC flag $F_{TCFC1}$ alone is set to 1, or both the first and second TCFC flags $F_{TCFC1}$, $F_{TCFC2}$ are set to 1 (see FIG. 4 showing the TCFC-checking subroutine).

(2) Abnormality of the TCS-ECU 20 while it is started is detected.

In this case, the start-checking OK flag $F_{TCSIOK}$ is set to 0 (see FIG. 8 showing the TCS-ECU start-checking subroutine).

[2] Abnormalities of the TCFC line (1) Disconnection or grounding of the TCFC line is detected.

In this case, immediately after detection of the abnormality, the first TCFC flag $F_{TCFC1}$ is set to 1, and when the same state has continued over the predetermined time period (e.g. 0.3 seconds), the second TCFC flag $F_{TCFC2}$ is set to 1 (see FIG. 4 showing the TCFC-checking subroutine).

(2) The intermediate value hold abnormality is detected.

In this case, the stop flag $F_{TCSTP}$ is set to 1 to thereby immediately stop traction control (see FIG. 9 showing the TCSTB/TCFC intermediate value hold-checking subroutine).

[3] Abnormality of the TCSTB line

Only when abnormality of the TCFC line has not been detected (i.e. $F_{TCFC1}=0$), disconnection or grounding of the TCSTB line is detected. In this case, the first TCSTB flag $F_{TCSTB1}$ is set to 1 after the predetermined time period (e.g. 0.3 seconds) has elapsed after detection of the abnormality, and the second TCSTB flag $F_{TCSTB2}$ is set to 1 after the predetermined time period (e.g. 0.3 seconds) has further elapsed (see FIG. 9 showing the TCSTB/TCFC intermediate value hold-checking subroutine).

B. Failsafe operations (1) When the start-checking flag $F_{TCSIOK}$ has become equal to 0:

The TC level is immediately set to LVLN (see FIG. 3), and at the same time the TC instruction signal is held at low level (see FIG. 11), and this state is continued. Accordingly, the alarm lamp 15 is kept on to warn the driver against the abnormality. Further, if the other conditions are satisfied, the stop flag $F_{TCSTP}$ is set to 1 (see FIG. 10) to thereby immediately stop traction control.

(2) When the first TCFC flag $F_{TCFC1}$ has become equal to 1:

If traction control is not being then carried out, the TC level is immediately set to LVLN. If traction control is being carried out, the TC level is immediately set to LVLFS, and held at LVLFS while the slip status signal transmitted through the TCSTB line is at high level, whereas after the slip status signal is changed to low level, the TC level is lowered from LVLFS stepwise by one level to LVLN whenever a predetermined time period elapses (see FIG. 7).

Thus, even if the possible abnormality of the TCFC line ($F_{TCFC1}=1$) is detected during traction control, traction control of reducing the engine output at a predetermined level (LVLFS) is continued so long as the slip status signal transmitted through the TCSTB line is at high level, which ensures controllability of the vehicle. Further, after the slip status signal is changed to low level to indicate dissipation of an excessive slip state of the driving wheels, the output torque of the driving wheels is progressively increased to prevent degradation of the driveability of the vehicle, and hence decrease burden on the driver.

(3) When the second TCFC flag $F_{TCFC2}$ has become equal to 1:

The TC instruction signal is held at low level (see FIG. 11). Accordingly, the alarm lamp 15 is lighted.

(4) When the first TCSTB flag $F_{TCSTB1}$ has become equal to 1:

Since detection of abnormality is not determinate, no failsafe operation is carried out.

(5) When the second TCSTB flag $F_{TCSTB2}$ has become equal to 1:

The TC instruction signal is held at low level (see FIG. 11), and the alarm lamp 15 is lighted. Further, the intermediate value hold abnormality of the TCFC line is checked (see FIG. 9).

When the intermediate value hold abnormality is detected, the stop flag $F_{TCSTP}$ is set to 1. In the meanwhile, even if the second TCSTB flag $F_{TCSTB2}$ is equal to 1, so long as the intermediate value hold abnormality is not detected, traction control responsive to the slip level signal, i.e. the slip level $S_{LVL}$ is continued. This makes it possible to preserve controllability of the vehicle, and at the same time avoid incoveniences resulting from the instantaneous stop of traction control, i.e. a sudden increase in the torque of the driving wheels and hence an increase in the burden on the driver.

(6) When the stop flag $F_{TCSTP}$ has become equal to 1:

Traction control is immediately stopped and not carried out thereafter.

Figure 13B:
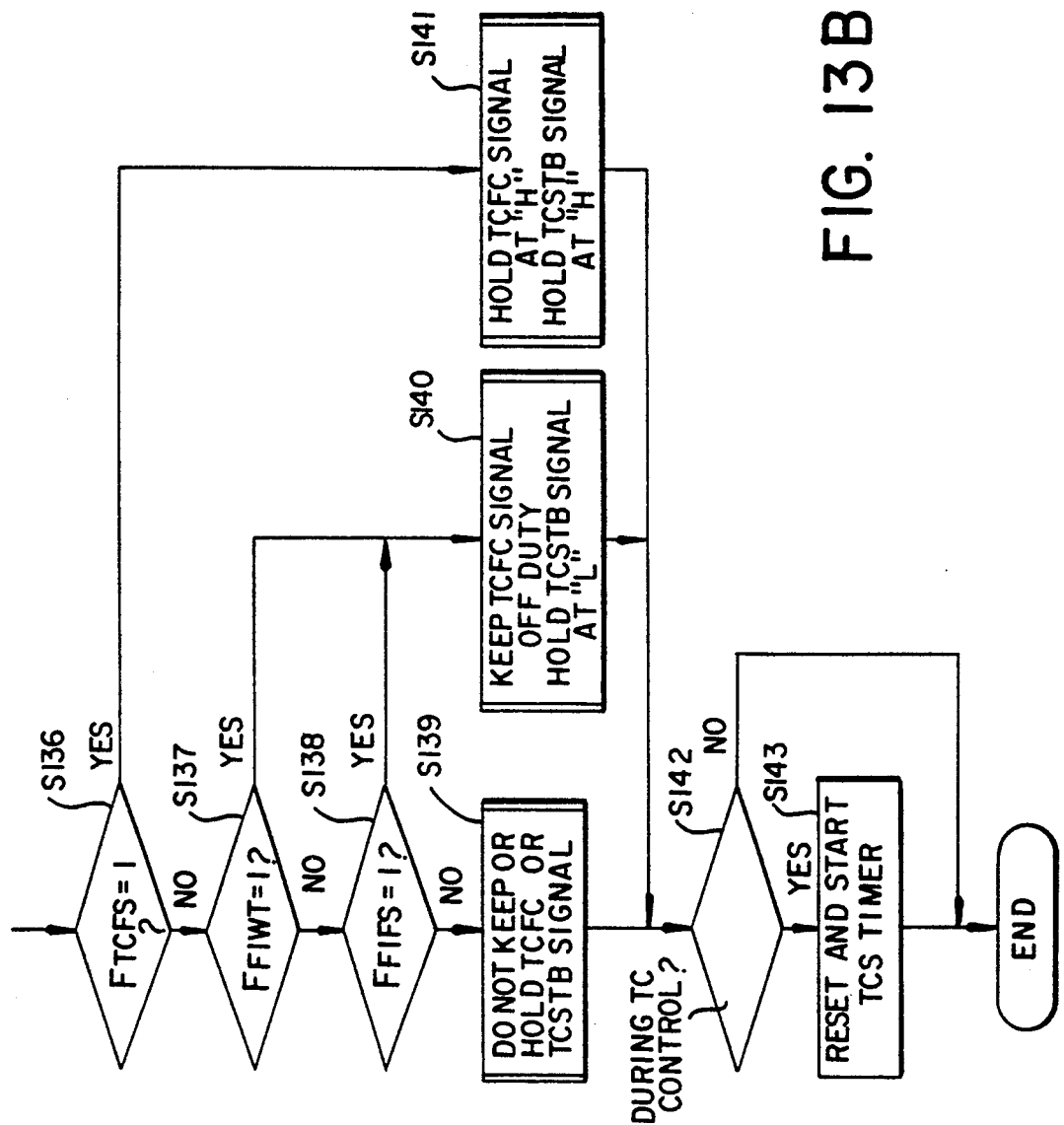

FIG. 13 shows a program of output control of the output circuits 207 and 208 and lighting control of the off lamp 14 and the alarm lamp 15 carried out by the control circuit 206 of the TCS-ECU 20.

The flowchart of FIG. 13 is for explaining the output control and the lighting control during and after traction control, and therefore in the figure steps are omitted for the output control and lighting control carried out immediately after turning-on of the ignition switch, which are shown in FIG. 12.

At a step S121, it is determined whether or not abnormality of any of the sensors for supplying detected parameter signals to the TCS-ECU 20 has been detected. If the answer to this question is affirmative (Yes), i.e. abnormality of any of the sensors has been detected, the alarm lamp 15 is lighted at a step S122, and it is determined at a step S123 whether or not a time period counted by a $t_{TCS}$ timer started at a step S143 referred to hereinafter for showing a time period having elapsed after execution of traction control exceeds a predetermined time period $t_{TCS0}$ (e.g. 2.5 seconds). If the answer to this question is negative (No), i.e. if the predetermined time period $t_{TCS0}$ has not elapsed after execution of traction control, a TCS abnormality detection flag $F_{TCFS}$ is set to 1 for showing that the TCS-ECU 20 has detected abnormality (step S124), and the program proceeds to a step S136. On the other hand, if the answer to the question of the step S123 is affirmative (Yes), i.e. if the predetermined time period has elapsed after execution of traction control, a TC-inhibiting flag $F_{FIFS}$ is set to 1 for showing that traction control should be inhibited due to detection of abnormality (step S125), and then the program proceeds to a step S136.

If the answer to the question of the step S121 is negative (No), i.e. if no abnormality of any of the sensors connected to the TCS-ECU 20 has been detected, it is determined at a step S126 whether or not the TC instruction signal supplied from the ENG-ECU 5 by way of the TCINH line is held at high level. If the answer to this question is affirmative (Yes), i.e. if the TC instruction signal is held at high level, which means that although no abnormality has been detected, the engine is not in a condition which allows traction control to be carried out, the same determination as at the step S123 is carried out at a step S127. If the answer to the question of the step S127 is negative (No), i.e. if the predetermined time period has not elapsed after execution of traction control, the program immediately proceeds to a step S136, whereas if the answer is affirmative (Yes), i.e. if the predetermined time period has elapsed after execution of traction control, the off lamp 14 is lighted at a step S128, and at the same time a TC condition flag $F_{FIWT}$ (corresponding to $F_{TCENBL}$ of the ENG-ECU 5) is set to 1 at a step S129 for showing that the engine is not in a condition which allows traction control to be carried out, followed by the program proceeding to the step S136.

If the answer to the question of the step S126 is negative (No), i.e. if the TC instruction signal is not held at high level, it is determined at a step S130 whether or not the TC instruction signal is held at low level. If the answer to this question is affirmative (Yes), i.e. if the TC instruction signal is held at low level, which means that traction control cannot be carried out due to an abnormality detected by the ENG-ECU 5, the alarm lamp 15 is lighted at a step S131, and then the same determination as at the step S123 is carried out at a step S132. If the answer to the question of the step S132 is negative (No), i.e. if the predetermined time period $t_{TCSO}$ has not elapsed after execution of traction control, the program immediately proceeds to the step S136, whereas if the answer is affirmative (Yes), i.e. if the predetermined time period $t_{TCSO}$ has elapsed after execution of traction control, the TC-inhibiting flag $F_{FIFS}$ is set to 1 at a step S133, followed by the program proceeding to the step S136.

If both the answers to the questions of the steps S126 and S130 are negative (No), i.e. if the TC instruction signal is a pulse signal having a fixed duty ratio, which means that the ENG-ECU 5 is supplying instructions allowing traction control to be carried out, the off lamp 14 is kept off at a step S134, and at the same time the TC condition flag $F_{FIWT}$ is set to 0 at a step S135, followed by the program proceeding to the step S136.

At the step S136, it is determined whether or not the TCS abnormality detection flag $F_{TCFS}$ is equal to 1. If the answer to this question is affirmative (Yes), i.e. if abnormality of any of the sensors connected to the TCS-ECU 20 is detected before the predetermined time period $t_{TCSO}$ elapses after execution of traction control, both the slip level signal and the slip status signal are held at high level at a step S141, and then the program proceeds to a step S142. When the ENG-ECU 5 detects that the slip level signal and the slip status signal are held at high level, it is judged that abnormality has occurred on the TCS-ECU 20 side, and the above described failsafe operation is carried out.

If the answer to the question of the step S136 is negative (No), i.e. if $F_{TCFS}=0$, it is determined at a step S137 whether or not the TC condition flag $F_{FIWT}$ is equal to 1. If the answer to this question is negative (No), i.e. if $F_{FIWT}=0$, it is determined at a step S138 whether or not the TC-inhibiting flag $F_{FIFS}$ is equal to 1. If either of the answers to the questions of the steps S137 and S138 is affirmative (Yes), i.e. if the engine is not in a condition allowing traction control to be carried out or traction control is inhibited due to the abnormality detected by the ENG-ECU 5, the slip level signal transmitted through the TCFC line is kept off duty (i.e. the signal is in the form of a pulse signal having such a duty ratio as to show that the slip state of the driving wheels does not require traction control) and the slip status signal transmitted through the TCSTB line is held at low level at a step S140, followed by the program proceeding to a step S142.

If all the answers to the questions of the steps S136 to S137 are negative (No), i.e. if no abnormality has been detected and at the same time the engine is in an operating condition which allows traction control to be carried out, the slip level signal transmitted through the TCFC line and the slip status signal transmitted through the TCSTB line are not held at either level but supplied as signals indicative of a detected slip state of the driving wheels to the ENG-ECU 5 at a step S139, followed by the program proceeding to the step S142.

At the step 142, it is determined whether or not normal traction control is being carried out, i.e. whether the slip level indicated by the slip level signal and the slip status signal demands traction control. If the answer to this question is negative (No), i.e. if traction control is not being carried out, the present program is immediately terminated, whereas if the answer is affirmative (Yes), i.e. if traction control is being carried out, the $t_{TCS}$ timer is reset (the count value is set to 0) at a step S143, followed by terminating the present program.

A case where an answer to any of the questions of the steps S123, S127, and S132 is negative (No), i.e. a case where the predetermined time period $t_{TCSO}$ has not elapsed after execution of traction control includes a case where traction control is being carried out. In other words, the case where the predetermined time period $t_{TCSO}$ has not elapsed after execution of traction control is a case where traction control was carried out the predetermined time period ($t_{TCSO}$) or a shorter time period before execution of any of the steps S123, S127, and S132 (hereinafter referred to as "the case where the predetermined time period has not elapsed").

According to the technique of FIG. 13 described above, the following controls are carried out:

(1) When abnormality of any of the sensors connected to the TCS-ECU 20 is detected:

The alarm lamp 15 is lighted, and in the case where the predetermined time period has not elapsed, the slip level signal and the slip status signal are both held at high level, to thereby cause the ENG-ECU 5 to carry out failsafe operations, such as gradually increasing the engine output until traction control is stopped. On the other hand, in cases other than the case where the predetermined time period has not elapsed, the slip level signal is kept off duty and the slip status signal is held at low level to thereby inhibit traction control thereafter.

(2) When no abnormality is detected by the ENG-ECU 5, but the engine is not in an operating condition to allow traction control to be carried out (TCINH is hled at "H"):

In the case where the predetermined time period has not elapsed, traction control is continued without holding the slip level signal at high level or keeping same off duty or holding the slip status signal at high or low level.

In cases other than the case where the predetermined time period has not elapsed, the off lamp 14 is lighted, and the slip level signal is kept off duty and the slip status signal is held at low level, to thereby inhibit traction control thereafter. However, if the engine operating condition is changed to one which allows traction control to be carried out, the off lamp is turned off, and the state of keeping the slip level signal off duty and holding the slip status signal at low level is cancelled.

(3) When an abnormality is detected by the ENG-ECU 5 (TCINH is held at "L"):

The alarm lamp 15 is lighted, and in the case where the predetermined time period has not elapsed, normal traction control is continued without keeping the slip level signal off duty or holding same at high level or holding the slip status signal at low or high level. On the other hand, in cases other than the case where the predetermined time period has not elapsed, the slip level signal is kept off duty and the slip status signal is held at low level, to thereby inhibit traction control thereafter.

According to the above described technique, if a state of the driving wheel slip control system in which traction control should be inhibited is detected, only after the predetermined time period has elapsed from the time point the slip state of the driving wheels ceased to demand traction control, the slip level signal is kept off duty and the slip status signal is held at low level. Therefore, traction control is not immediately stopped during or immediately after execution of same, which makes it possible to avoid an increase in the burden on the driver resulting from a sudden increase in the torque of the driving wheels.

In addition, although in the driving wheel slip control system according to the above described embodiment of the invention, the amount of fuel supplied to the engine is decreased in order to decrease the engine output, this is not limitative, but the amount of intake air may be decreased by decreasing the throttle valve opening. Alternatively, when an excessive slip state of the driving wheels is detected, the driving wheel slip may be reduced by applying a mechanical load on the system which transmits a driving force from the engine to the driving wheels.

Further, the prime mover for driving the driving wheels is not limited to an internal combustion engine, but an electric motor or a gas turbine may be used.

What is claimed is:

1. In a driving wheel slip control system which is installed in a vehicle having driving wheels, for controlling a slip of said driving wheels, said vehicle having a prime mover installed therein for driving said driving wheels, said system including slip status signal-generating means for detecting an excessive slip state of said driving wheels and generating a slip status signal indicative of whether or not said driving wheels is in a predetermined slip state, slip level signal-generating means for generating a slip level signal indicative of a degree of slip of said driving wheels, and abnormality-determining means for determining that said slip status signal is abnormal when a logical relationship between said slip status signal and said slip level signal is abnormal; the improvement comprising:

prime mover operating condition-determining means for determining whether or not said prime mover is accelerating when said abnormality-determining means determines that said slip status signal is abnormal; and redetermining means for determining that said slip level signal is abnormal when said prime mover is not accelerating and at the same time said slip level signal indicates a degree of slip corresponding to said predetermined slip state.

2. A driving wheel slip control system according to claim 1, including control-inhibiting means for inhibiting slip control of said driving wheels irrespective of output of said slip level signal when said redetermining means determines that said slip level signal is abnormal.

3. In a driving wheel slip control system which is installed in a vehicle having driving wheels, for controlling a slip of said driving wheels, said vehicle having a prime mover installed therein for driving said driving wheels, said system including slip status signal-generating means for detecting an excessive slip state of said driving wheels and generating a slip status signal indicative of whether or not said driving wheels is in a predetermined slip state, slip level signal-generating means for generating a slip level signal indicative of a degree of slip of said driving wheels, and abnormality-determining means for determining that said slip status signal is abnormal when a logical relationship between said slip status signal and said slip level signal is abnormal; the improvement comprising:

prime mover operating condition-determining means for determining whether or not said prime mover is accelerating when said abnormality-determining means determines that said slip status signal is abnormal; and control inhibiting means for causing slip control of said driving wheels responsive to said slip level signal to be continued until it is determined that said prime mover is in an operating condition other than acceleration, and inhibiting said slip control of said driving wheels thereafter while said prime mover is in said operating condition other than acceleration.

4. In a driving wheel slip control system which is installed in a vehicle having driving wheels, for controlling a slip of said driving wheels, said system including slip level signal-generating means for generating a slip level signal indicative of a degree of slip of said driving wheels, and abnormality-determining means supplied with said slip level signal for determining that said slip level signal is abnormal; the improvement comprising:

driving wheel output-reducing means for setting an amount of reduction in output of said driving wheels to a predetermined amount when it is determined that said slip level signal is abnormal during execution of slip control of said driving wheels.

5. A driving wheel slip control system according to claim 4, wherein said predetermined amount is such an amount as to allows said vehicle to run at a speed of 60 km/h to 100 km/h at the maximum output of said driving wheels that is obtained when said amount of reduction in output of said driving wheels is set to said predetermined amount.

6. A driving wheel slip control system according to claim 4 or 5, wherein said driving wheel output-reducing means includes reduction amount-decreasing means for decreasing said amount of reduction in output of said driving wheels as time elapses.

7. A driving wheel slip control system according to claim 4 or 5, wherein said vehicle has a prime mover installed therein for driving said driving wheels, and wherein said system includes prime mover operating condition-determining means for determining, from a time point said abnormality-determining means determines that said slip level signal is abnormal, whether or not said prime mover is accelerating, and control-inhibiting means for inhibiting slip control of said driving wheels when it is determined that said prime mover is not accelerating.

8. A driving wheel slip control system according to claim 6, wherein said vehicle has a prime mover installed therein for driving said driving wheels, and wherein said system includes prime mover operating condition-determining means for determining, from a time point said abnormality-determing means determines that said slip level signal is abnormal, whether or not said prime mover is accelerating, and control-inhibiting means for inhibiting slip control of said driving wheels when it is determined that said prime mover is not accelerating.

9. In a driving wheel slip control system which is installed in a vehicle having driving wheels, for controlling a slip of said driving wheels, said system including excessive slip signal-generating means for detecting an excessive slip state of said driving wheels and generating an excessive slip signal when said driving wheels are in a predetermined slip state, driving wheel output-reducing means for reducing output of said driving wheels based on said excessive slip signal from said excessive slip signal-generating means, control-permitting state-determining means for determining whether said output of said driving wheels can be reduced by said driving wheel output-reducing means, and operation-stopping means for stopping operation of said excessive slip signal-generating means when said control-permitting state-determining means outputs a signal indicating that said output of said driving wheels cannot be reduced by said driving wheel output-reducing means;

the improvement comprising:

retarding means for retarding stopping operation of said operation-stopping means when said excessive slip-signal generating means detected said excessive slip state of said driving wheels a predetermined time period or a time period shorter than said predetermined time period before said control-permitting state-determining means outputs said signal indicating that said output of said driving wheels cannot be reduced by said driving wheel output-reducing means.

10. In a driving wheel slip control system which is installed in a vehicle having driving wheels, for controlling a slip of said driving wheels, said vehicle having a prime mover installed therein for driving said driving wheels, said system including a first control unit having slip level signal-generating means for generating a slip level signal indicative of a degree of slip of said driving wheels, and a second control unit having prime mover output-reducing means responsive to said slip level signal for reducing output of said prime mover, and abnormality-determining means supplied with said slip level signal for determining that said slip level signal is abnormal;

the improvement wherein:

said second control unit includes operation-permitting state-determining means for determining whether or not said prime mover output-reducing means can be operated, and notifying means responsive to output from said abnormality-determining means and output from said operation-permitting state-determining means for detecting a first state in which said slip level signal is abnormal, a second state in which said slip level signal is normal but said prime mover output-reducing means cannot be operated, and a third state in which said slip level signal is normal and at the same time said prime mover output-reducing means can be operated, and informing said first control unit of a detected one of said first to third states.

11. A driving wheel slip control system according to claim 10, wherein said slip level signal-generating means of said first control unit is inhibited from operating when said first control unit is informed of detection of said first state or said second state by said second control unit.

12. A driving wheel slip control system according to claim 10 or 11, including indicating means for discriminately indicating each of said first to third states, and wherein said first control unit drives said indicating means in response to information from said notifying means.

13. A driving wheel slip control system according to claim 10 or 11, including a power supply for supplying operating voltage to said system, and wherein said abnormality-determing means determines that said slip level signal is abnormal, based upon a value of said slip level signal assumed when said power supply is started.

14. A driving wheel slip control system according to claim 12, including a power supply for supplying operating voltage to said system, and wherein said abnormality-determining means determines that said slip level signal is abnormal, based upon a value of said slip level signal assumed when said power supply is started.

15. A driving wheel slip control system according to claim 10 or 11, wherein said operation-permitting state-determining means includes prime mover sensor abnormality-determining means for determining whether or not any of sensors for sensing operating conditions of said prime mover for controlling same is abnormal.

16. A driving wheel slip control system according to claim 12, wherein said operation-permitting state-determining means includes prime mover sensor abnormality-determining means for determining whether or not any of sensors for sensing operating conditions of said prime mover for controlling same is abnormal.

17. A driving wheel slip control system according to claim 13, wherein said operation-permitting state-determining means includes prime mover sensor abnormality-determining means for determining whether or not any of sensors for sensing operating conditions of said prime mover for controlling same is abnormal.

18. A driving wheel slip control system according to claim 14, wherein said operation-permitting state-determining means includes prime mover sensor abnormality-determining means for determining whether or not any of sensors for sensing operating conditions of said prime mover for controlling same is abnormal.

* * * * *